United States Patent
Kitahara et al.

(10) Patent No.: US 11,871,087 B2
(45) Date of Patent: *Jan. 9, 2024

(54) RECEIVER, RECEPTION METHOD, TRANSMITTER, AND TRANSMISSION METHOD

(71) Applicant: SATURN LICENSING LLC, New York, NY (US)

(72) Inventors: Jun Kitahara, Shizuoka (JP); Naohisa Kitazato, Tokyo (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,379

(22) Filed: Sep. 28, 2022

(65) Prior Publication Data

US 2023/0012548 A1 Jan. 19, 2023

Related U.S. Application Data

(63) Continuation of application No. 15/531,779, filed as application No. PCT/JP2015/085943 on Dec. 24, 2015, now Pat. No. 11,496,810.

(30) Foreign Application Priority Data

Jan. 7, 2015 (JP) .................................. 2015001873

(51) Int. Cl.
*H04N 21/24* (2011.01)
*H04N 21/234* (2011.01)
(Continued)

(52) U.S. Cl.
CPC ...... *H04N 21/64322* (2013.01); *H04H 60/73* (2013.01); *H04H 60/82* (2013.01);
(Continued)

(58) Field of Classification Search
CPC ................................................ H04N 21/20–40
See application file for complete search history.

(56) References Cited

U.S. PATENT DOCUMENTS 9,225,939 B1 12/2015 Kidd et al.
2003/0009769 A1 1/2003 Hensgen et al.
(Continued)

FOREIGN PATENT DOCUMENTS

JP 2008263616 10/2008
JP 2013236391 11/2013
(Continued)

OTHER PUBLICATIONS

International Search Report dated Apr. 5, 2016 in PCT/JP2015/085943 filed Dec. 24, 2015—* cited in parent application.

*Primary Examiner* — Mushfikh I Alam
(74) *Attorney, Agent, or Firm* — Richard LaPeruta

(57) ABSTRACT

The present technology relates to a receiver for efficiently acquiring a component configuring a service, a reception method, a transmitter, and a transmission method.
The receiver acquires first signaling data distributed on a broadcast wave of digital broadcasting in an IP transmission system, acquires broadcast signaling data as second signaling data, acquires communication signaling data as the second signaling data when flag information included in the broadcast signaling data indicates that the communication signaling data is provided from a server over the Internet together with the broadcast signaling data, and connects to a stream of a broadcast component or a stream of a communication component thereby to control reproduction of the component on the basis of at least one of the broadcast signaling data and the communication signaling data. The present technology is applicable to TV receivers, for example.

20 Claims, 22 Drawing Sheets

(51) Int. Cl.
   *H04N 21/643*    (2011.01)
   *H04H 60/73*     (2008.01)
   *H04N 21/61*     (2011.01)
   *H04N 21/434*    (2011.01)
   *H04H 60/82*     (2008.01)
   *H04N 21/462*    (2011.01)
   *H04N 21/2362*   (2011.01)
   *H04N 21/44*     (2011.01)
   *H04H 20/24*     (2008.01)

(52) U.S. Cl.
   CPC ....... *H04N 21/234* (2013.01); *H04N 21/2362* (2013.01); *H04N 21/4345* (2013.01); *H04N 21/44* (2013.01); *H04N 21/4622* (2013.01); *H04N 21/6112* (2013.01); *H04N 21/6125* (2013.01); *H04H 20/24* (2013.01)

(56) References Cited

U.S. PATENT DOCUMENTS

| | | |
|---|---|---|
| 2005/0268323 A1 | 12/2005 | Yamaguchi et al. |
| 2007/0006265 A1* | 1/2007 | Youm ............... H04N 21/4622 725/39 |
| 2007/0124250 A1 | 5/2007 | Yamashima et al. |
| 2008/0155626 A1* | 6/2008 | Matsumoto .......... G11B 27/322 725/109 |
| 2008/0201738 A1* | 8/2008 | Song ................ H04N 21/4622 725/39 |
| 2009/0069029 A1* | 3/2009 | Guvenc ................ G01S 5/14 455/456.1 |
| 2009/0291631 A1* | 11/2009 | Xue ................... H04L 67/51 455/3.01 |
| 2009/0313663 A1 | 12/2009 | Kitazato et al. |
| 2010/0037267 A1 | 2/2010 | Bennett |
| 2012/0050619 A1 | 3/2012 | Kitazato et al. |
| 2012/0054214 A1 | 3/2012 | Yamagishi et al. |
| 2012/0079550 A1* | 3/2012 | Hirota ................ H04N 21/2362 725/39 |
| 2012/0327955 A1 | 12/2012 | Herrmann et al. |
| 2013/0305308 A1* | 11/2013 | Lee .................... H04H 20/40 725/116 |
| 2014/0047496 A1* | 2/2014 | Kim ................... H04N 21/8547 725/137 |
| 2014/0096173 A1* | 4/2014 | Song ................ H04N 21/4425 725/110 |
| 2014/0109128 A1 | 4/2014 | Lee et al. |
| 2014/0120861 A1* | 5/2014 | Kwak .................. H04W 4/90 455/404.1 |
| 2014/0150048 A1 | 5/2014 | Oh et al. |
| 2014/0304758 A1 | 10/2014 | Tanaka et al. |
| 2015/0113584 A1 | 4/2015 | Herrmann et al. |
| 2015/0143448 A1 | 5/2015 | Oh et al. |
| 2016/0182973 A1* | 6/2016 | Winograd .......... H04N 21/8358 725/25 |
| 2017/0054520 A1* | 2/2017 | Kwak ................ H04N 21/814 |
| 2017/0373776 A1 | 12/2017 | Lee et al. |

FOREIGN PATENT DOCUMENTS

| | | |
|---|---|---|
| JP | 2014096814 | 5/2014 |
| KR | 20100105314 | 9/2010 |
| KR | 20120123638 | 11/2012 |
| WO | 2009048208 | 4/2009 |
| WO | 2011105803 | 9/2011 |
| WO | 2014084592 | 6/2014 |
| WO | 2014209057 | 12/2014 |

* cited by examiner

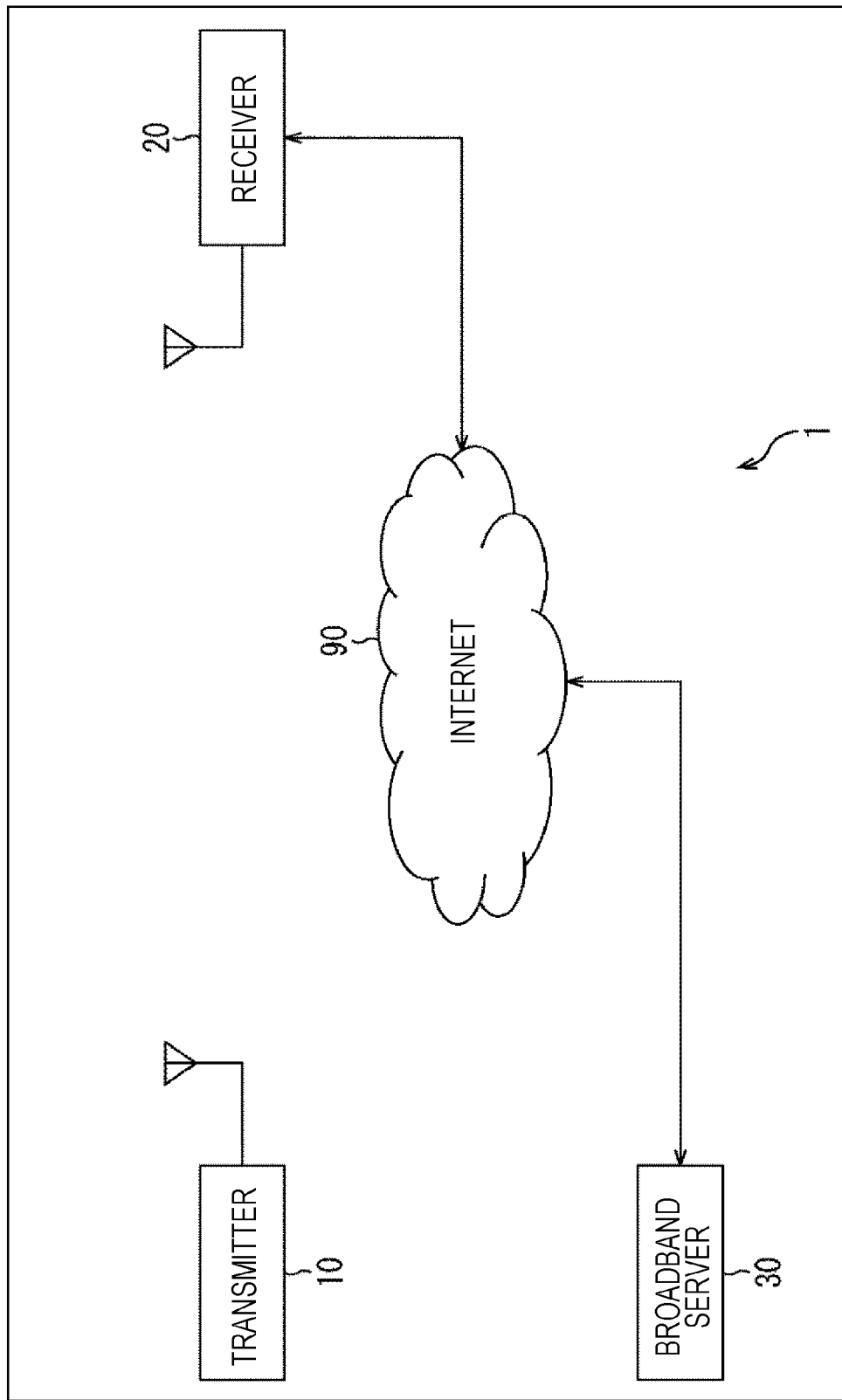

FIG. 2

| SIGNALING DATA | | METADATA | | CONTENTS |
|---|---|---|---|---|
| LLS | | FIC | Fast Information Channel | CONFIGURATION INFORMATION OF BBP STREAM OR SERVICE, ETC. |
| | | SCD | Service Configuration Description | CONFIGURATION INFORMATION OF SERVICE, ETC. |
| | | EAD | Emergency Alert Description | EMERGENCY ALERT INFORMATION |
| | | RRD | Rating Region Description | RATING INFORMATION |
| | | DCD | Default Component Description | INFORMATION OF PRECEDING ACQUISITION |
| SLS | | USBD | User Service Bundle Description | METADATA REFERENCE INFORMATION |
| | | USD | User Service Description | DISTRIBUTION ROUTE SPECIFICATION INFORMATION, ETC. |
| | | SDP | Session Description Protocol | CONFIGURATION INFORMATION OF STREAM, ETC. |
| | | MPD | Media Presentation Description | STREAM REPRODUCTION MANAGEMENT INFORMATION |
| | | IS | Initialization Segment | INITIALIZATION SEGMENT |
| | | LSID | LCT Session Instance Description | MANAGEMENT INFORMATION TRANSMITTED PER ROUTE SESSION |
| | | ESGc | Electric Service Guide Current | ESG CURRENT |
| | | SPD | Service Parameter Description | PARAMETER OF SERVICE LEVEL |

FIG. 12

| Syntax | No. of bits | Mnemonic | Description |
|---|---|---|---|
| FIC | | | |
| { | | | |
|    FIC_protocol_version | 8 | uimsbf | Protocol version |
|    Broadcast_stream_id | 16 | uimsbf | Broadcast Stream ID |
|    SCD_exist_flag | 1 | bslbf | Indicates SCD is delivered in LLS |
|    reserved | 7 | bslbf | |
|    If (SCD_exist_flag) { | | | |
|       Bbpstream_id | 8 | uimsbf | BBP Stream ID which LLS is delivered |
|       SCD_version | 8 | uimsbf | SCD version |
|    } | | | |
|    FIC_level_descriptor() | var | | FIC-level descriptor |
|    num_services | 8 | uimsbf | Number of BBP Stream |
|    for (i=0; i<num_services; i++) { | | | |
|       service_id | 16 | uimsbf | Service ID |
|       bbpstream_id | 8 | uimsbf | The ID of one BBP stream which carries SLS |
|       provider_id | 16 | uimsbf | Provider ID |
|       service_category | 5 | uimsbf | Service category (e.g. A/V, audio, ESG, NRT) |
|       short_service_name_length | 3 | uimsbf | Length of short service name (TBD) |
|       short_service_name | 16*m | bslbf | Short service name(TBD) |
|       service_status | 3 | uimsbf | Service status (active/inactive/show/hidden) |
|       IP_version_flag | 1 | bslbf | IP packet version(IPv4/IPv6) |
|       num_of_class | 3 | bslbf | number of class |
|       for (num_of_class) { | | | |
|          class_id | 8 | bslbf | Class id(e.g. core, enhance) -> recommend to use the minimum capability code. |
|       SLS_version (service_data_version) | 8 | uimsbf | Version number of SLS |
|       sp_indicator | 1 | bslbf | Service protection |
|       SLS_src_IP_addr_flag | 1 | bslbf | Indicate source IP address is delivered or not |
|       reserved | 2 | bslbf | |
|       if(SLS_source_IP_address_flag) { | | | |
|          SLS_src_IP_addr | 32 or 128 | uimsbf | Source IP address |
|       } | | | |
|       SLS_dst_IP_addr | 32 or 128 | uimsbf | Destination IP address |
|       SLS_dst_port | 16 | uimsbf | UDP port number |
|       SLS_TSI | 16 | uimsbf | TSI number |
|       SLS_shortcut | 1 | bslbf | Indicate broadcast service is basic or not |
|       reserved | | bslbf | |
|       } | | | |
|    } | | | |
| } | | | |

FIG. 13

| Element/Attribute(with@) | Cardinality | Data Type | Description |
|---|---|---|---|
| SCD | | | |
| @majorProtocolVersion | 0..1 | integer | Major protocol version |
| @minorProtocolVersion | 0..1 | integer | Minor protocol version |
| @broadcaststreamId | 1 | integer | physical channel ID |
| @name | 0..1 | string | physical channel name |
| Tuning_RF | 0..n | | Physical parameters |
| @frequency | 1 | integer | Center frequency of this RF channel |
| @preamble | 0..1 | string | Common PHY parameter of this RF channel |
| Service | 1..n | | Service |
| @serviceId | 1 | integer | Service ID(major+minor) |
| @globalUniqueServiceId | 1 | anyURI | Global unique service ID |
| @longName | 0..1 | string | Long service name |
| SignalingOverInternet | 0..1 | anyURI | SLS location of broadband |
| @uri | 1 | | Signaling URI |

FIG. 14

| Element/Attribute(with@) | Cardinality | Data Type | Description |
|---|---|---|---|
| SPD | 1 | | |
| @serviceId | 1 | integer | service identifier |
| @SignalingOverInernetFlag | 0..1 | boolean | indicate SLS via broadband is provided or not |
| ContentAdvisoryDescription | 1 | - | Rating information |
| NRTServiceDescription | 0..1 | - | NRT service configuration |

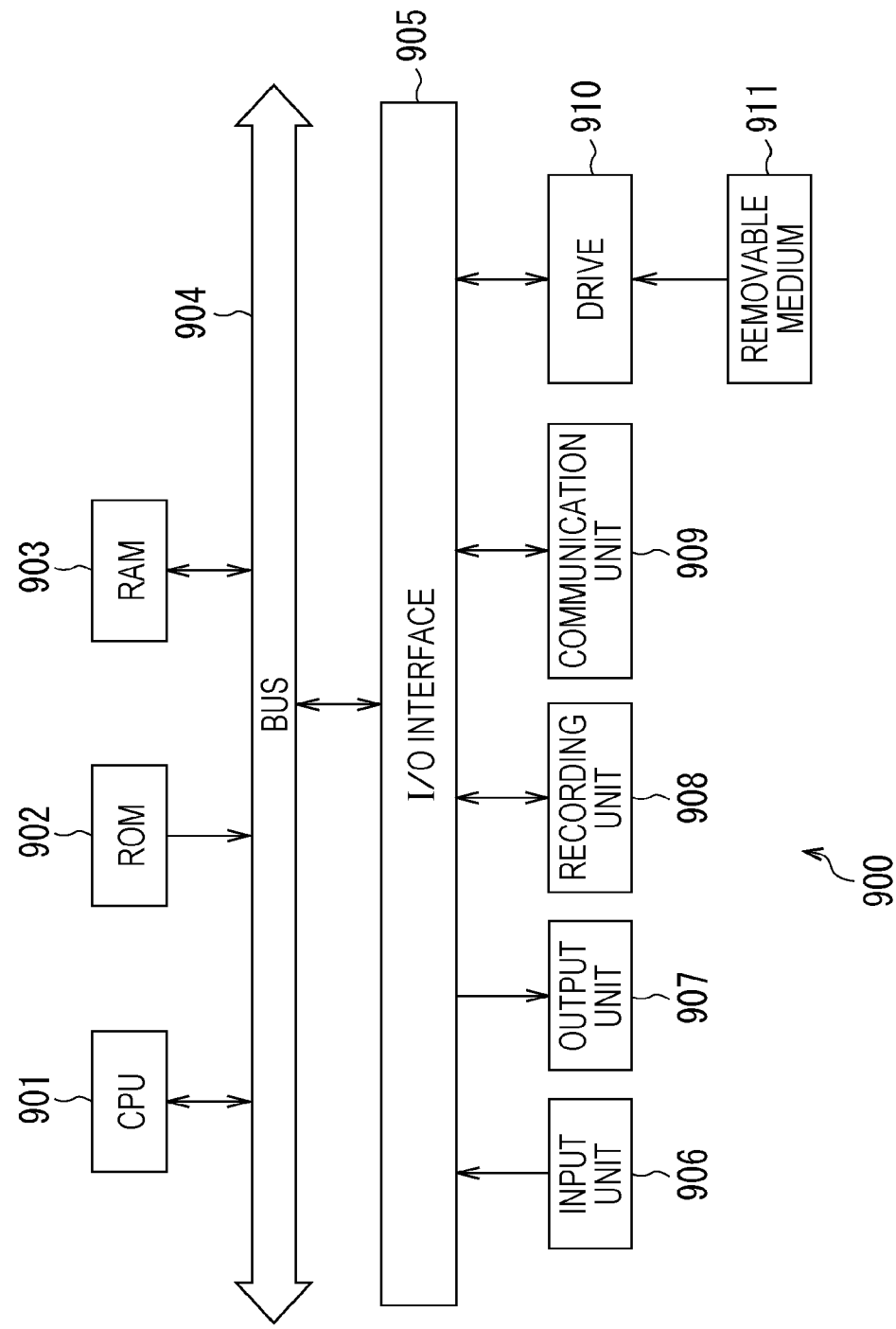

RECEIVER, RECEPTION METHOD, TRANSMITTER, AND TRANSMISSION METHOD

TECHNICAL FIELD

The present technology relates to a receiver, a reception method, a transmitter, and a transmission method, and particularly to a receiver capable of efficiently acquiring a component configuring a service, a reception method, a transmitter, and a transmission method.

BACKGROUND ART

In recent years, the digital broadcast services have been started in the nations (see Patent Document 1, for example). The digital broadcast standards in the nations employ the moving picture experts group phase 2-transport stream system (MPEG2-TS) as transmission system, but it is assumed that the Internet protocol (IP) transmission system using IP packets used in the field of communication for the digital broadcasting is introduced thereby to provide more advanced services.

CITATION LIST

Patent Document

Patent Document 1: Japanese Patent Application Laid-Open No. 2008-263616

SUMMARY OF THE INVENTION

Problems to be Solved by the Invention

Note that real-time object delivery over unidirectional transport (ROUTE) is employed as one candidate of the systems for transmitting a component such as video, audio or subtitles in the IP transmission system. ROUTE is extended file delivery over unidirectional transport (FLUTE) for live broadcast service.

However, a technical system for transmitting a component configuring a service such as program in the ROUTE session has not been established, and there has been required to efficiently acquire a component configuring a service.

The present technology has been made under such a situation, and is directed to efficiently acquire a component configuring a service.

Solutions to Problems

A receiver according to a first aspect of the present technology includes: a first acquisition unit for acquiring first signaling data distributed via broadcast on a broadcast wave of digital broadcasting in an Internet protocol (IP) transmission system; a second acquisition unit for acquiring broadcast signaling data distributed via broadcast as second signaling data including information on a stream of a component configuring a service on the basis of the first signaling data; a third acquisition unit for, when flag information included in the broadcast signaling data indicates that communication signaling data distributed via communication is provided from a server over the Internet together with the broadcast signaling data, acquiring the communication signaling data as the second signaling data on the basis of the first signaling data; and a control unit for connecting to a stream of a broadcast component distributed via broadcast or a stream of a communication component distributed via communication thereby to control reproduction of the component on the basis of at least one of the broadcast signaling data and the communication signaling data.

The receiver according to the first aspect of the present technology may be an independent apparatus, or may be an internal block configuring one apparatus. Further, the reception method according to the first aspect of the present technology is a reception method for the receiver according to the first aspect of the present technology.

With the receiver and the reception method according to the first aspect of the present technology, first signaling data distributed via broadcast on a broadcast wave of digital broadcasting in an IP transmission system is acquired, broadcast signaling data distributed via broadcast is acquired as second signaling data including information on a stream of a component configuring a service on the basis of the first signaling data, communication signaling data is acquired as the second signaling data on the basis of the first signaling data when flag information included in the broadcast signaling data indicates that the communication signaling data distributed via communication is provided from a server over the Internet together with the broadcast signaling data, and a stream of a broadcast component distributed via broadcast or a stream of a communication component distributed via communication is connected and reproduction of the component is controlled on the basis of at least one of the broadcast signaling data and the communication signaling data.

A transmitter according to a second aspect of the present technology includes: a first generation unit for generating first signaling data distributed via broadcast on a broadcast wave of digital broadcasting in an IP transmission system; a second generation unit for generating broadcast signaling data including flag information indicating whether communication signaling data distributed via communication is provided from a server over the Internet together with the broadcast signaling data distributed via broadcast as second signaling data including information on a stream of a component configuring a service; and a transmission unit for transmitting the first signaling data and the broadcast signaling data as the second signaling data on a broadcast wave of digital broadcasting in the IP transmission system.

The transmitter according to the second aspect of the present technology may be an independent apparatus, or may be an internal block configuring one apparatus. The transmission method according to the second aspect of the present technology is a transmission method for the transmitter according to the second aspect of the present technology.

With the transmitter and the transmission method according to the second aspect of the present technology, first signaling data distributed via broadcast on a broadcast wave of digital broadcasting in an IP transmission system is generated, broadcast signaling data including flag information indicating whether communication signaling data distributed via communication is provided from a server over the Internet together with the broadcast signaling data distributed via broadcast is generated as the second signaling data including information on a stream of a component configuring a service, and the first signaling data and the broadcast signaling data as the second signaling data are transmitted on a broadcast wave of digital broadcasting in the IP transmission method.

Effects of the Invention

According to the first aspect and the second aspect of the present technology, it is possible to efficiently acquire a component configuring a service.

Note that the effects described herein are not necessarily limited, and any effect described in the present disclosure may be obtained.

BRIEF DESCRIPTION OF DRAWINGS

FIG. 1 is a diagram illustrating an exemplary configuration of a service providing system.

FIG. 2 is a diagram illustrating exemplary signaling data.

FIG. 12 is a diagram illustrating exemplary syntax of FIC.

FIG. 13 is a diagram illustrating exemplary syntax of SCD.

FIG. 14 is a diagram illustrating exemplary syntax of SPD.

FIG. 25 is a diagram illustrating an exemplary configuration of a computer.

MODE FOR CARRYING OUT THE INVENTION

Figure 3:
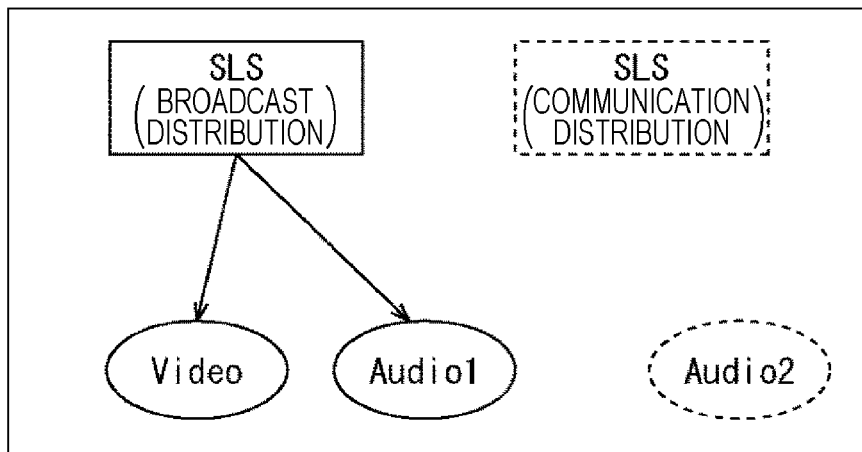
FIG. 3 is a diagram illustrating SLS distribution routes of a broadcast service and its description contents.

Embodiments of the present technology will be described below with reference to the drawings. Note that the description will be made in the following order.

1. Configuration of system
2. Outline of digital broadcasting in IP transmission system
3. Exemplary applications
   (1) Exemplary application 1: broadcast service
   (2) Exemplary application 2: hybrid service 1 (SLS broadcast distribution)
   (3) Exemplary application 3: hybrid service 2 (SLS broadcast/communication distribution)
4. Exemplary syntax
5. Configuration of each apparatus configuring system
6. Flow of processing performed in each apparatus
7. Variants
8. Configuration of computer

1. Configuration of System

Exemplary Configuration of Service Providing System

In FIG. 1, a service providing system 1 is directed for providing services such as programs. The service providing system 1 is configured of a transmitter 10, a receiver 20, and a broadband server 30. Further, in FIG. 1, the receiver 20 is mutually connected to the broadband server 30 via the Internet 90.

The transmitter 10 conforms to a predetermined standard of terrestrial digital TV broadcasting, for example, and is provided by a broadcaster. Additionally, according to the embodiment of the present technology, a terrestrial digital TV broadcast standard may employ a standard such as advanced television systems committee standards (ATSC).

The transmitter 10 transmits a stream of a component such as video, audio, or subtitles configuring a service (which will be called "service component" below) together with signaling data on a broadcast wave of digital broadcasting. Herein, the service is an edited program (TV program) produced by a broadcaster (which will be called "program" below), for example.

Additionally, there are two items of signaling data including service-independent low layer signaling (LLS) signaling data and service-based service layer signaling (SLS) signaling data, and the detailed contents of them will be described below.

Further, a component such as video or audio, and SLS signaling data are transmitted in the ROUTE session. ROUTE is extended FLUTE for live broadcast service. Note that ROUTE may be called FLUTE+ (FLUTE plus), FLUTE enhancement, or the like.

Herein, the files and the like to be transmitted are managed as one object by transport objet identifier (TOI) in the ROUTE session. Further, a set of objects is managed as one session by transport session identifier (TSI). That is, a specific file can be designated by two items of identification information of TSI and TOI in the ROUTE session.

The receiver 20 conforms to a predetermined standard of terrestrial digital TV broadcasting such as ATSC, and is a fixed receiver such as TV receiver or set top box, or a mobile receiver such as Smartphone, cell phone, tablet computer, notebook type personal computer, or a terminal used in an automobile.

The receiver 20 receives a broadcast wave of digital broadcasting transmitted from the transmitter 10, and acquires signaling data transmitted on the broadcast wave of digital broadcasting. The receiver 20 connects to a stream of (a component configuring) a service transmitted on the broadcast wave of digital broadcasting transmitted from the transmitter 10 on the basis of the signaling data, and reproduces (outputs) the video and audio acquired from the stream. Further, the receiver 20 has a communication function, and can access the broadband server 30 via the Internet 90.

The broadband server 30 streams a component such as video, audio, or subtitles configuring a service such as program via the Internet 90 in response to a request from the receiver 20. Further, the broadband server 30 distributes the signaling data via the Internet 90 in response to a request from the receiver 20.

The receiver 20 connects to a stream of (a component configuring) a service streamed from the broadband server 30 via the Internet 90 on the basis of the signaling data from the transmitter 10 or the broadband server 30, and reproduces (outputs) the video and audio acquired from the stream.

Additionally, FIG. 1 illustrates a configuration in which a broadcast wave of digital broadcasting from the transmitter 10 is directly received by the receiver 20, but a broadcast wave of digital broadcasting may be transmitted via one or more relay stations (not illustrated). Further, when being a mobile receiver, the receiver 20 connects to the Internet 90 via a public wireless local area network (LAN) access point, or connects to the broadband server 30 via a mobile network (not illustrated) such as long term evolution (LTE).

Further, the receiver 20 may not have a communication function or a communication function may be disabled even if the receiver 20 has the communication function. In this case, the receiver 20 cannot access the broadband server 30. Furthermore, FIG. 1 illustrates a case in which the broadband server 30 distributes both a stream of a component such as video or audio and signaling data, but a stream of a component and signaling data may be distributed in different servers.

2. Outline of Digital Broadcasting in IP Transmission System

As descried above, the MPEG2-TS system is employed as a transmission system in the digital broadcast standard in each nation, and it is assumed that the IP transmission system using IP packets used in the field of communication for the digital broadcasting is introduced thereby to provide more advanced services in the future. In particular, ATSC3.0, which is a presently-developed next generation broadcast standard in the U.S., is expected to employ digital broadcasting in the IP transmission system.

On a broadcast wave of digital broadcasting in the IP transmission system, one or more base band packet (BBP) streams are transmitted in a predetermined frequency band corresponding to a physical channel (RF Channel). Further, a stream of low layer signaling (LLS), one or more service channels (services), or the like is transmitted in each BBP stream. Service-independent low layer LLS signaling data is transmitted in the LLS stream.

The service channel (service) is configured of service layer signaling (SLS), and streams of a component configuring a program such as video, audio, or subtitles. Service-based SLS signaling data is transmitted in the SLS stream.

Additionally, the SLS signaling data and the component data are transmitted in the ROUTE session. Further, the elements configuring each service are assigned with a common IP address, and the SLS signaling data or the component data can be packaged per service by use of the IP address. Incidentally, a service and an IP address may be associated on one-to-one basis, or a service may be associated with a plurality of IP addresses.

Herein, a broadcast wave (RF Channel) in a predetermined frequency band is assigned with a broadcast stream ID per broadcaster, for example. Further, one or more BBP streams transmitted in each broadcast wave are assigned with a BBP stream ID. Further, one or more services transmitted in each BBP stream are assigned with a service ID.

In this way, the ID system in the IP transmission system employs a configuration for a combination (Triplet) of network ID, transport stream ID, and service ID used in the MPEG2-TS system, and a BBP stream configuration and a service configuration in the network are indicated by the triplet.

The use of the ID system can achieve matching with the MPEG2-TS system which is widely used at present. Additionally, in the ID system in the IP transmission system, the broadcast stream ID and the BBP stream ID correspond to the network ID and the transport stream ID in the MPEG2-TS system.

Additionally, a stream of a network time protocol (NTP) or electronic service guide (ESG) service may be transmitted in addition to a stream of LLS or service channel in the BBP stream. NTP is time information for synchronization between a transmission side and a reception side. The ESG service is an electronic service guide defined in open mobile alliance (OMA).

Exemplary Signaling Data

FIG. 2 is a diagram illustrating exemplary signaling data.

As described above, the signaling data includes LLS signaling data transmitted in the LLS stream and SLS signaling data transmitted in the SLS stream.

The LLS signaling data is service-independent low layer signaling data, and is transmitted in a lower hierarchy (layer) than the IP layer in the protocol stack in the IP transmission system. For example, the LLS signaling data includes LLS metadata such as fast information channel (FIC), service configuration description (SCD), emergency alerting description (EAD), region rating description (RRD), and default component description (DCD).

Further, the SLS signaling data is service-based signaling data, and is transmitted in a higher hierarchy (layer) than the IP layer in the protocol stack in the IP transmission system. For example, the SLS signaling data includes SLS metadata such as user service bundle description (USBD), user service description (USD), session description protocol (SDP), media presentation description (MPD), initialization segment (IS), LCT session instance description (LSID), electric service guide current (ESGc), and service parameter description (SPD). Additionally, the SLS signaling data is transmitted in the ROUTE session.

FIC includes information indicating a configuration of the BBP stream or service, or the like in the network in the ID system corresponding to the MPEG2-TS system. Further, though described below in detail, FIC describes therein SLS shortcut information (SLS_shortcut) and class information (class).

FIC transmits information required for tuning a service (tuning information), and describes essential parameters therein in consideration of a transmission band of the signaling data. Further, a transmission cycle of FIC is shortened, and thus a service tuning time can be shortened. Additionally, a detailed structure of FIC will be described with reference to syntax of FIC in FIG. 12. Further, the description is made herein assuming that FIC is transmitted in the LLS stream, but it may be transmitted in a lower hierarchy (layer) than the physical layer or the like other than the LLS stream, for example.

SCD includes information indicating a configuration of a service, or the like. SCD is suitable for describing data with a large data length or the like since it can be previously acquired in an initial scan processing. Further, the transmission cycle of SCD is set to be longer than the transmission cycle of FIC, thereby restricting a transmission band. Further, though described below in detail, communication SLS information (SignalingOverInternet element) is described in SCD. Additionally, a detailed structure of SCD will be described with reference to syntax of SCD in FIG. 13.

EAD includes emergency alert information on emergency alert. RRD includes information on rating. DCD is information for tuning an essential service acquired prior to the SLS signaling data.

USBD includes reference information for referring to the SLS metadata such as USD, MPD, or SDP. USD includes information for specifying a route for distributing a component configuring a service, or the like. Additionally, USD may be included in USBD. SDP is information for connecting to a stream of a component transmitted in units of service. SDP includes service-based service attribute, stream configuration information or attribute, filter information, location information, and the like.

MPD is information for managing reproduction of a stream of a component transmitted in units of service. MPD lists a plurality of components therein, and includes information such as segment uniform resource locator (URL) indicating a destination. IS is an initialization segment for media segment (MS) in the ROUTE session.

Note that it is assumed that USBD, USD, MPD, SDP, and IS, which is standardized by any one of third generation partnership project (3GPP), moving picture expert group (MPEG), or Internet engineering task force (IETF), is referred to.

LSID is extended file delivery table (FDT) of FLUTE for real-time services, and is assumed as management information for a stream of a component transmitted per ROUTE session. Additionally, LSID may be transmitted in a different ROUTE session from other SLS metadata. ESGc is ESG current information, and is directed for transmitting information on a currently-broadcasted program. Additionally, ESG is standardized by open mobile alliance (OMA).

SPD defines therein a parameter of a service level. Further, though described below in detail, SPD describes therein communication SLS flag information (SignalingOverInternetFlag attribute). A detailed structure of SPD will be described with reference to syntax of SPD in FIG. 14.

Additionally, FIC among the LLS signaling data is assumed as data in the binary form, but other LLS metadata such as SCD is assumed as data in the text form. Further, all the SLS metadata in the SLS signaling data is assumed as data in the text form. For example, the LLS metadata such as SCD or the SLS metadata such as SPD can be described in a markup language such as extensible markup language (XML).

(SLS Signaling Data of Broadcast Service)

Incidentally, the services provided by the service providing system 1 include a broadcast service in which a component is distributed via broadcast, and a hybrid service in which a component is distributed both via broadcast and via communication depending on a component distribution form.

FIG. 3 is a diagram illustrating distribution routes of SLS signaling data and its description contents when a broadcast service is provided.

In the broadcast service, the communication SLS illustrated in a dotted line is not distributed and only the broadcast SLS is distributed out of the SLS signaling data distributed via broadcast (which is also called "broadcast SLS" below) and the SLS signaling data distributed via communication (which is also called "communication SLS" below). Further, FIG. 3 illustrates the broadcast components distributed via broadcast such as video and audio 1, and the communication component distributed via communication such as audio 2, but in the broadcast service, a stream of audio 2 illustrated in a dotted line is not distributed, and the streams of video and audio 1 are distributed via broadcast.

That is, in the broadcast service of FIG. 3, both the SLS signaling data and the components are distributed via broadcast, and thus the information on the streams of video and audio 1 as broadcast components is described in the broadcast SLS as illustrated in the arrows. Therefore, the receiver 20 can connect to the streams of the broadcast components with reference to the SLS metadata described in the broadcast SLS.

(SLS Signaling Data in Hybrid Service)

FIGS. 4 to 7 are the diagrams illustrating the distribution routes of the SLS signaling data and its description contents when a hybrid service is provided. That is, the respective cases of FIGS. 4 to 7 are common in that a hybrid service is provided, and are different in the distribution routes of the SLS signaling data and its description contents.

(Hybrid Service: Case 1)

Figure 4:
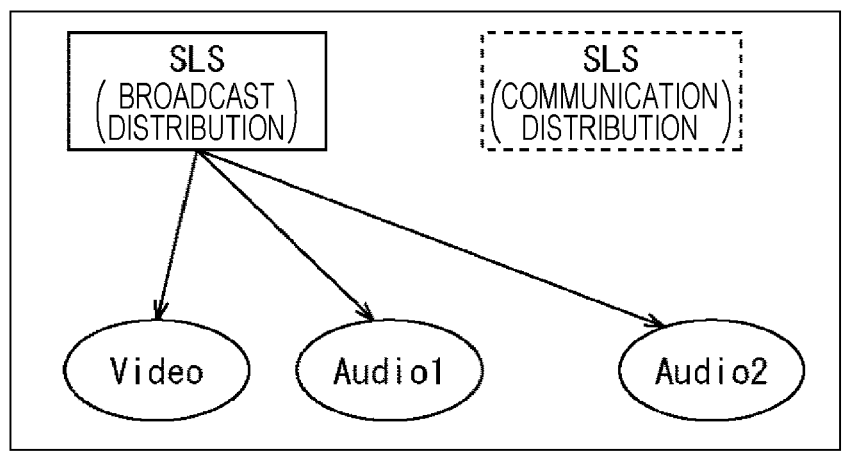
FIG. 4 is a diagram illustrating SLS distribution routes in a hybrid service and its description contents.

In the hybrid service of FIG. 4, only the broadcast SLS out of the broadcast SLS and the communication SLS is distributed, and the broadcast components and the communication component are distributed.

That is, in the hybrid service of FIG. 4, the SLS signaling data is distributed via broadcast and the components are distributed via broadcast and via communication, and thus the information on the streams of video and audio 1 as broadcast components and the stream of audio 2 as communication component is described in the broadcast SLS as illustrated in the arrows. Therefore, the receiver 20 can connect to a stream of the broadcast components or the communication component with reference to the SLS metadata described in the broadcast SLS.

(Hybrid Case: Case 2)

Figure 5:
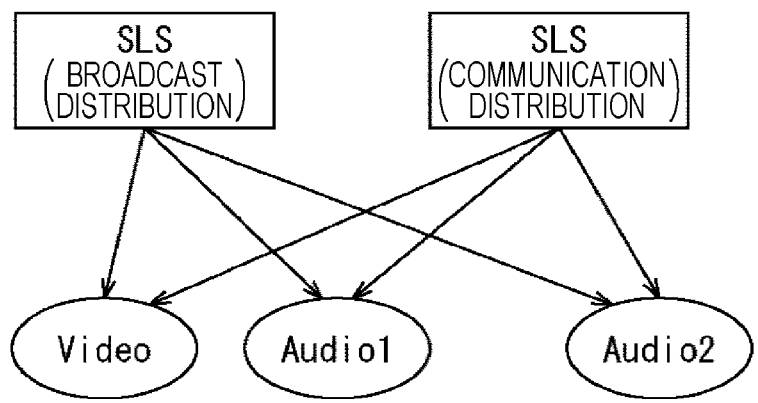
FIG. 5 is a diagram illustrating SLS distribution routes in a hybrid service and its description contents.

In the hybrid service of FIG. 5, the broadcast SLS and the communication SLS are distributed, and the broadcast components and the communication component are distributed.

That is, in the hybrid service of FIG. 5, the information on the streams of video and audio 1 as broadcast components and the stream of audio 2 as communication component is described in both the broadcast SLS and the communication SLS as illustrated in the arrows. For example, the same information may be described as the information on all the components in the broadcast SLS and the communication SLS, or part of the information on all the components is described in the broadcast SLS, and the rest of it (difference) may be described in the communication SLS. Therefore, the receiver 20 can connect to a stream of the broadcast components or the communication component with reference to the SLS metadata described in the broadcast SLS or the communication SLS.

(Hybrid Service: Case 3)

Figure 6:
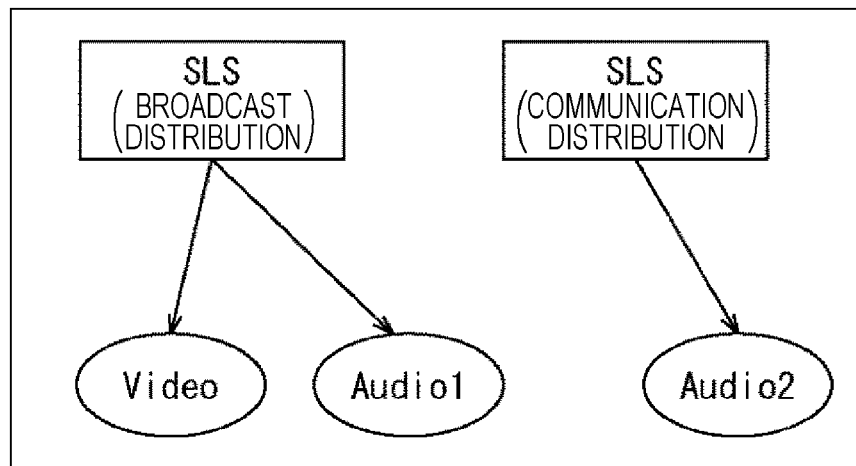
FIG. 6 is a diagram illustrating SLS distribution routes in a hybrid service and its description contents.

In the hybrid service of FIG. 6, the broadcast SLS and the communication SLS are distributed, and the broadcast components and the communication component are distributed.

That is, in the hybrid service of FIG. 6, the information on the streams of video and audio 1 as broadcast components is described in the broadcast SLS as illustrated in the arrows.

Further, the information on the stream of audio 2 as communication component is described in the communication SLS. That is, in this case, the information on the broadcast components and the information on the communication component are separately described in the broadcast SLS and the communication SLS, respectively. Thus, the receiver 20 can connect to the streams of the broadcast components with reference to the SLS metadata described in the broadcast SLS, and can connect to the stream of the communication component with reference to the SLS metadata described in the communication SLS.

(Hybrid Service: Case 4)

Figure 7:
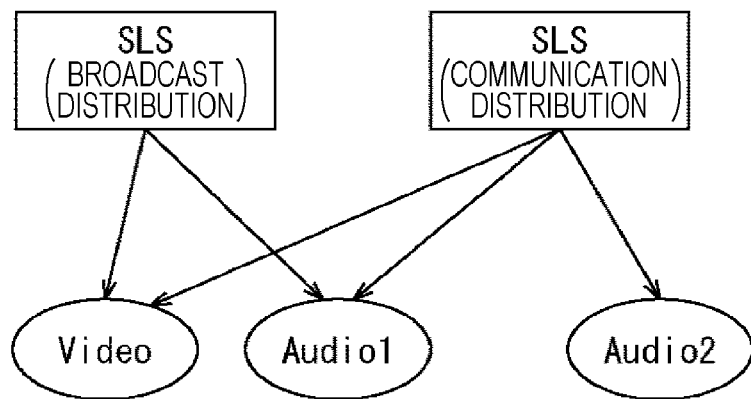
FIG. 7 is a diagram illustrating SLS distribution routes in a hybrid service and its description contents.

In the hybrid service of FIG. 7, the broadcast SLS and the communication SLS are distributed, and the broadcast components and the communication component are distributed.

That is, in the hybrid service of FIG. 7, the information on the streams of video and audio 1 as broadcast components is described in the broadcast SLS as illustrated in the arrows. Further, the information on the streams of video and audio 1 as broadcast components and the information on the stream of audio 2 as communication component are described in the communication SLS.

In this case, only the information on the broadcast components is described in the broadcast SLS, and the information on all the components is described in the communication SLS. That is, a band for transmitting the data can be restricted in the broadcast distribution, but the restriction is not imposed in the communication distribution, and thus more information can be described in the communication SLS than in the broadcast SLS and the information on all the components can be described therein. Therefore, the receiver 20 can connect to the streams of the broadcast components with reference to the SLS metadata described in the broadcast SLS, and can connect to a stream of the broadcast components or the communication component with reference to the SLS metadata described in the communication SLS.

(Association Between Broadcast SLS and Communication SLS)

Figure 8:
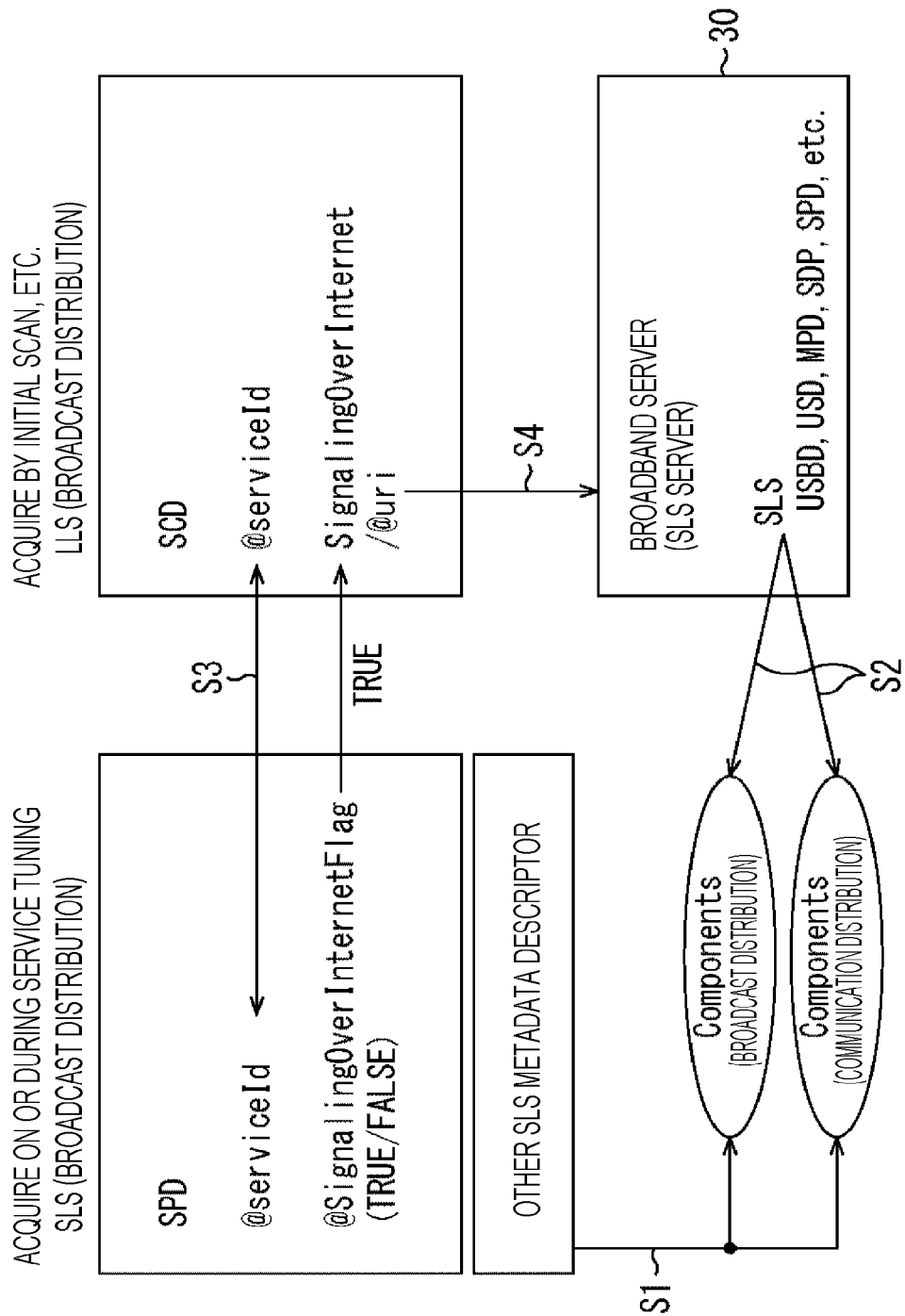
FIG. 8 is a diagram illustrating a method for solving destination of a component according to the description contents of communication SLS flag information in SPD.

FIG. 8 is a diagram illustrating a method for solving a component destination depending on description contents of communication SLS flag information (SignalingOverInternetFlag attribute) in SPD.

The receiver 20 performs the initial scan processing and the like thereby to acquire and record the broadcasted LLS signaling data (such as FIC or SCD) in NVRAM. Here, when a service is tuned by a user operation or the like, the receiver 20 acquires the broadcasted SLS signaling data (broadcast SLS) and confirms the communication SLS flag information (SignalingOverInternetFlag attribute) described in SPD.

Herein, when "FALSE" is designated for the communication SLS flag information, the fact means that the information on all the components is described in the broadcast SLS and the communication SLS does not need to be acquired, and thus the receiver 20 connects to a stream of the broadcast components distributed via broadcast or the communication component distributed via communication with reference to other SLS metadata (descriptor) such as USED, USD, MPD, or SDP which is transmitted as the broadcast SLS (S1).

On the other hand, when "TRUE" is designated for the communication SLS flag information, the fact means that the communication SLS is distributed in addition to the broadcast SLS, and the information on all the components is described for the broadcast SLS and the communication SLS. Thus, the receiver 20 connects to a stream of the broadcast components or the communication component with reference to other SLS metadata (descriptor) such as USED, USD, MPD, or SDP which is transmitted as the broadcast SLS (S1), and connects to a stream of the broadcast components or the communication component with reference to the SLS metadata (descriptor) such as USED, USD, MPD, SDP, or SPD (S2) which is transmitted as the communication SLS.

Specifically, SPD transmitted as the SLS signaling data (broadcast SLS) and SCD transmitted as the LLS signaling data are associated with each other by a service ID (S3), and thus when "TRUE" is designated as the communication SLS flag information, the receiver 20 acquires SLS broadband location information (uri attribute) with reference to the communication SLS information (SignalingOverInternet element) described in SCD. Then, the receiver 20 then accesses the broadband server 30 via the Internet 90 according to URL indicated by the SLS broadband location information thereby to acquire the SLS signaling data (communication SLS) (S4). The receiver 20 connects to a stream of the broadcast components or the communication component according to the SLS metadata such as USED as the communication SLS which is acquired from the broadband server 30 (S2).

As described above, when the communication SLS flag information in SPD is "FALSE," the receiver 20 connects to a stream of a component by use of only the SLS metadata transmitted as the broadcast SLS, and when the communication SLS flag information in SPD is "TRUE," the receiver 20 connects to a stream of a component by use of the SLS metadata transmitted as the communication SLS in addition to the SLS metadata transmitted as the broadcast SLS.

Here, SPD can define a parameter of a service level (channel scope), and can update it at any timing by updating the version information, and thus can update it on program basis or at finer granularity (such as program between CMs), for example. Thus, a service provider such as broadcaster can freely select the SPD update frequency depending on the form of a service. That is, the service provider selects whether to provide the communication SLS in addition to the broadcast SLS depending on a channel or program, for example, and describes the communication SLS flag information (SignalingOverInternetFlag attribute) depending on the selection result in SPD, thereby notifying the SLS distribution situation to the receiver 20.

For example, when a component of program A is distributed only via broadcast in a channel, "FALSE" is designated as the communication SLS flag information in SPD and the streams of the broadcast components are connected only by the broadcast SLS. Thereby, the service provider can provide program A as broadcast-completed service (broadcast service). Further, for example, when a component of program B following program A is distributed both via broadcast and via communication in a channel, "TRUE" is designated as the communication SLS flag information in SPD, the communication SLS is acquired from the broadband server 30, and a stream of the broadcast components or the communication component is connected via the broadcast SLS and the communication SLS. Thereby, the service provider can provide program B as hybrid-type service (hybrid service).

3. Exemplary Applications (1) Exemplary Application 1: Broadcast Service

Figure 9:
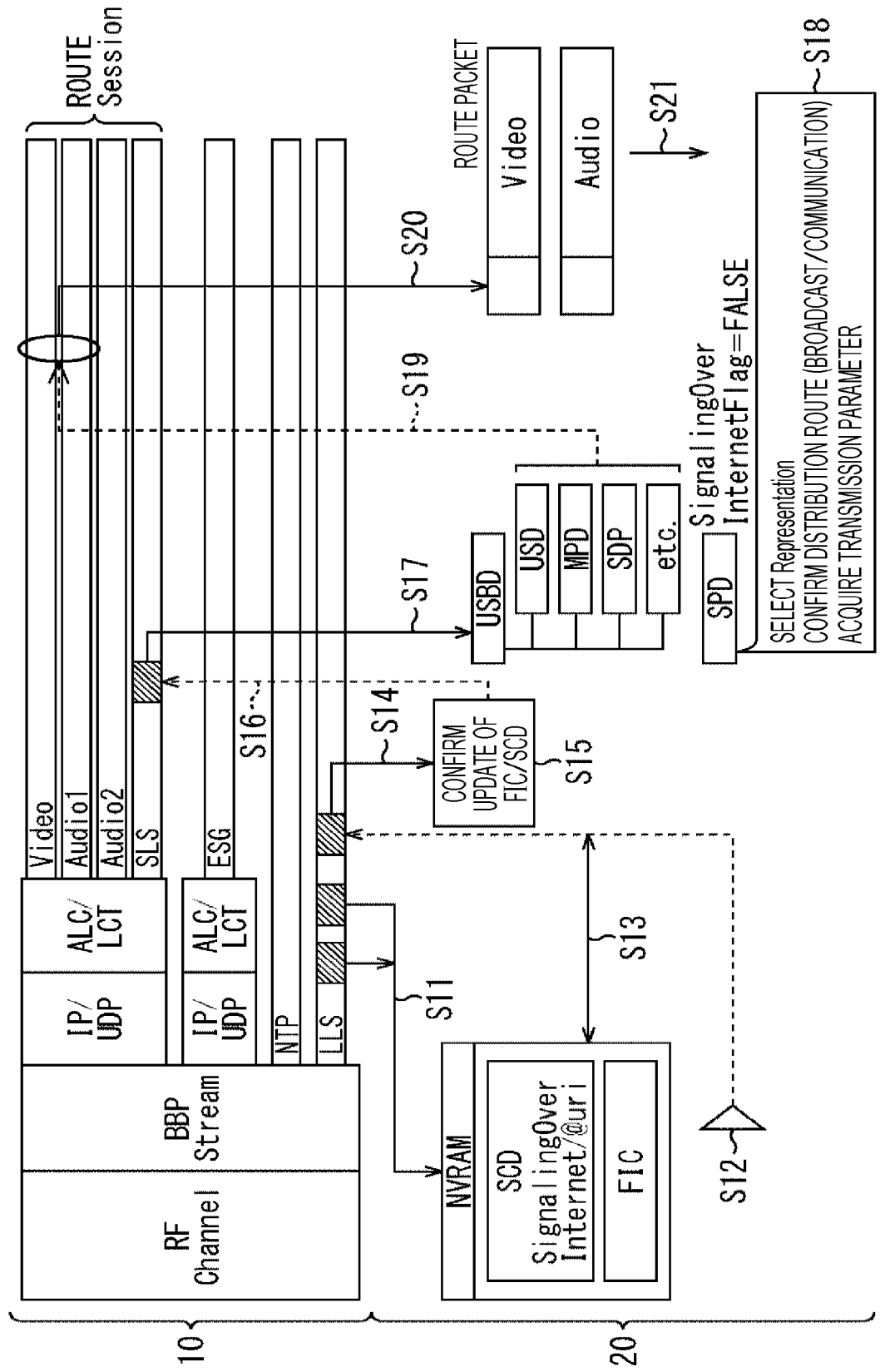
FIG. 9 is a sequence diagram of a broadcast service.

FIG. 9 is a sequence diagram for explaining a specific flow of processing in the receiver 20 when exemplary application 1 for providing a broadcast service is employed.

Incidentally, FIG. 9 illustrates a flow of data transmitted from the transmitter 10 on the upper side and illustrates a flow of processing in the receiver 20 for processing the data on the lower side. Further, a direction of time is assumed to be from the left side to the right side in FIG. 9.

In FIG. 9, the transmitter 10 transmits a broadcast wave (RF Channel) of digital broadcasting in the IP transmission system. The streams of the broadcast components and the SLS signaling data (broadcast SLS) configuring a broadcast service (such as program), and the stream of the LLS signaling data are transmitted in the BBP stream on the broadcast wave. Incidentally, the broadcast components and the SLS signaling data configuring the broadcast service are transmitted in the ROUTE session in units of LCT packet on IP/UDP. Additionally, the ESG stream is transmitted in the ROUTE session in the BBP stream. Further, NTP as time information is transmitted in the BBP stream thereby to achieve synchronization between the transmission side and the reception side.

The receiver 20 acquires and records FIC and SCD transmitted in the LLS stream in NVRAM in the initial scan processing (S11). When a service is tuned by a user operation or the like, the receiver 20 reads FIC and SCD recorded in NVRAM thereby to acquire the tuning information corresponding to the service ID of the service to be tuned and to start a tuning processing (S12, S13).

In the tuning processing, update of FIC and SCD is confirmed (S14, S15) by connecting to the LLS stream and checking the version information prior to acquisition of the SLS signaling data. When at least one of FIC and SCD is updated, the updated FIC or SCD is acquired and recorded in NVRAM. Thereby, the latest tuning information is recorded in NVRAM during the tuning processing.

The receiver 20 reads SLS bootstrap information from a loop of the service to be tuned of the latest FIC recorded in NVRAM. The SLS bootstrap information designates therein IP address, port number, and TSI for connecting to the SLS stream corresponding to the service to be tuned. Thereby, the receiver 20 connects to the SLS stream transmitted in the ROUTE session according to the IP address, the port number, and TSI included in the SLS bootstrap information thereby to acquire the SLS signaling data (broadcast SLS) (S16, S17).

The SLS metadata such as USBD or SPD is acquired for the broadcast SLS. Here, the SLS metadata such as USD, MPD, or SDP is acquired with reference to USBD. Further, "FALSE" is designated for the communication SLS flag information (SignalingOverInternetFlag attribute) in SPD. This means that the information on all the components is described in the broadcast SLS and the communication SLS does not need to be acquired, and corresponds to the case (FIG. 3) of the broadcast service described above.

Furthermore, a component which configures the service to be tuned and is to be subjected to a rendering processing is selected from among the components listed in Representation element in AdaptationSet element in MPD. The receiver 20 then matches URL of the stream of the component to be selected described in Representation element in MPD with URL described in deliveryMethod element in USD thereby to specify whether the distribution route of the component to be selected is via broadcast or via communication (S18).

In exemplary application 1 of FIG. 9, a broadcast service is provided and a component to be selected is distributed via broadcast, and thus the receiver 20 analyzes the SLS metadata such as SDP or LSID as the broadcast SLS thereby to acquire the transmission parameters such as IP address, port number, TSI, and TOI for connecting to the stream of the broadcast component to be selected (S18). The receiver 20 then connects to the streams of video and audio 1 configuring the service to be tuned, which are transmitted in the ROUTE session according to the IP address, the port number, TSI and TOI acquired in the processing in step S18 (S19).

Thereby, the receiver 20 can acquire a ROUTE packet (LCT packet) storing therein the video data and audio data configuring the service to be tuned (S20). The receiver 20 then performs the rendering processing thereby to reproduce the video and audio of a program corresponding to the service to be tuned (broadcast service) (S21).

As described above, in exemplary application 1, "FALSE" is designated for the communication SLS flag information (SignalingOverInternetFlag attribute) in SPD as the broadcast SLS, and thus the receiver 20 connects to the streams of the broadcast components by use of only the broadcast SLS, and reproduces the video and audio of the program corresponding to the service to be tuned provided as the broadcast service. At this time, the receiver 20 can confirm whether the communication SLS is provided in addition to the broadcast SLS with reference to the communication SLS flag information in SPD, thereby immediately acquiring the required SLS signaling data and efficiently acquiring the component configuring the service to be tuned.

(2) Exemplary Application 2: Hybrid Service 1 (SLS Broadcast Distribution)

Figure 10:
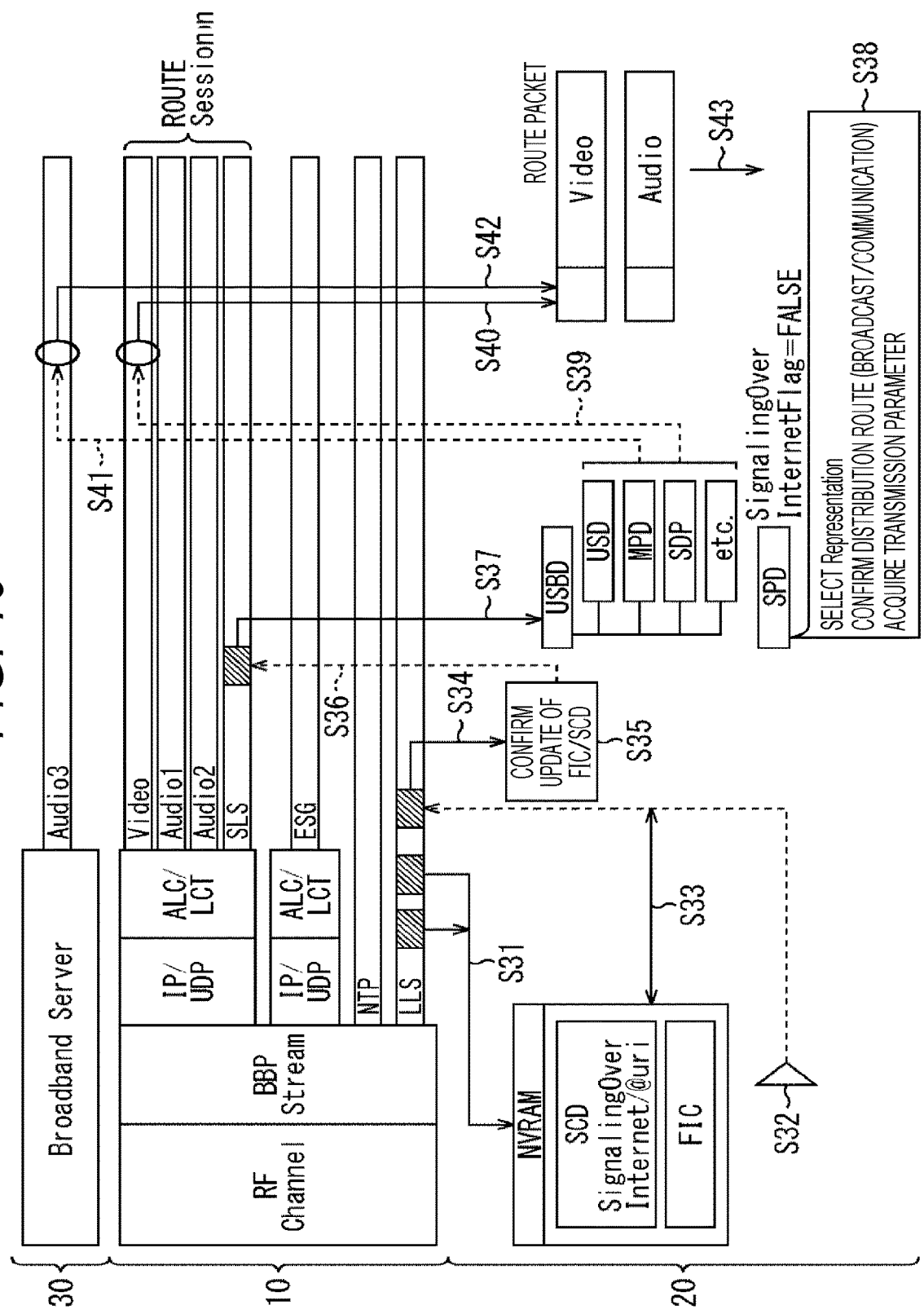
FIG. 10 is a sequence diagram of hybrid service 1.

FIG. 10 is a sequence diagram for explaining a specific flow of processing in the receiver 20 when exemplary application 2 for providing a hybrid service is employed. Incidentally, in exemplary application 2, the information on all the components configuring a hybrid service is described in the broadcast SLS and the communication SLS is not required.

Additionally, FIG. 10 illustrates a flow of data transmitted from the transmitter 10 and the broadband server 30 on the upper side and illustrates a flow of processing in the receiver 20 for processing the data on the lower side. Further, a direction of time is assumed to be from the left side to the right side in FIG. 10.

In FIG. 10, the transmitter 10 transmits a broadcast wave (RF Channel) of digital broadcasting in the IP transmission system. The broadcast components and the SLS signaling data (broadcast SLS) configuring a hybrid service (such as program), and the streams of ESG data, NTP data, and LLS signaling data are transmitted in the BBP stream on the broadcast wave. Incidentally, the streams of video data and audio data as broadcast components configuring the hybrid service, and the stream of the SLS signaling data are transmitted in the same ROUTE session.

Further, in FIG. 10, the broadband server 30 streams audio data (Audio3) as communication component via the Internet 90.

The receiver 20 acquires and records FIC and SCD transmitted in the LLS stream in NVRAM in the initial scan processing (S31). When a service is tuned by a user operation or the like, the receiver 20 reads FIC and SCD recorded in NVRAM thereby to acquire the tuning information corresponding to the service ID of the service to be tuned and to start the tuning processing (S32, S33). In the tuning processing, update of FIC and SCD transmitted in the LLS stream is first confirmed and the latest tuning information is recorded in NVRAM (S34, S35).

The receiver 20 then reads the SLS bootstrap information from a loop of the service to be tuned of the latest FIC recorded in NVRAM. Thereby, the receiver 20 can connect to the SLS stream transmitted in the ROUTE session and acquire the SLS signaling data (broadcast SLS) according to the IP address, the port number, and TSI included in the SLS bootstrap information (S36, S37).

The SLS metadata such as USED or SPD is acquired for the broadcast SLS. Here, the SLS metadata such as USD, MPD, or SDP is acquired with reference to USED. Further, "FALSE" is designated for the communication SLS flag information (SignalingOverInternetFlag attribute) in SPD. This means that the information on all the components (the broadcast components and the communication component) is described in the broadcast SLS and the communication SLS does not need to be acquired, and corresponds to case 1 (FIG. 4) of the hybrid service described above.

Further, a component which configures the service to be tuned and is to be subjected to the rendering processing is selected from among the components listed in Representation element in AdaptationSet element in MPD. The receiver 20 then matches URL of the stream of the component to be selected described in Representation element in MPD with URL described in deliveryMethod element in USD thereby to specify whether the distribution route of the component to be selected is via broadcast or via communication (S38).

In exemplary application 2 of FIG. 10, a hybrid service is provided, and a component to be selected is distributed via broadcast or via communication. In this example, the receiver 20 connects to the stream of video configuring the service to be selected which is transmitted in the ROUTE session according to the IP address, the port number, TSI, and TOI included in the transmission parameters acquired by analyzing the SLS metadata such as SDP or LSID as broadcast SLS, thereby acquiring a ROUTE packet (LCT packet) storing the video data therein (S39, S40). Further, the receiver 20 accesses the broadband server 30 via the Internet 90 according to the segment URL of audio 3 as communication component described in MPD as broadcast SLS, and acquires (a packet storing therein) the streamed audio data (S41, S42).

The receiver 20 then performs the rendering processing thereby to reproduce the video and audio of a program corresponding to the service to be tuned (hybrid service) (S43).

As described above, in exemplary application 2, "FALSE" is designated for the communication SLS flag information (SignalingOverInternetFlag attribute) in SPD as broadcast SLS, and thus the receiver 20 connects to a stream of the broadcast components or the communication component by use of only the broadcast SLS thereby to reproduce the video and audio of a program corresponding to the service to be tuned provided as hybrid service. At this time, the receiver 20 can confirm whether the communication SLS is provided in addition to the broadcast SLS with reference to the communication SLS flag information in SPD thereby to immediately acquire the required SLS signaling data and to efficiently acquire the component configuring the service to be tuned.

(3) Exemplary Application 3: Hybrid Service 2 (SLS Broadcast/Communication Distribution)

Figure 11:
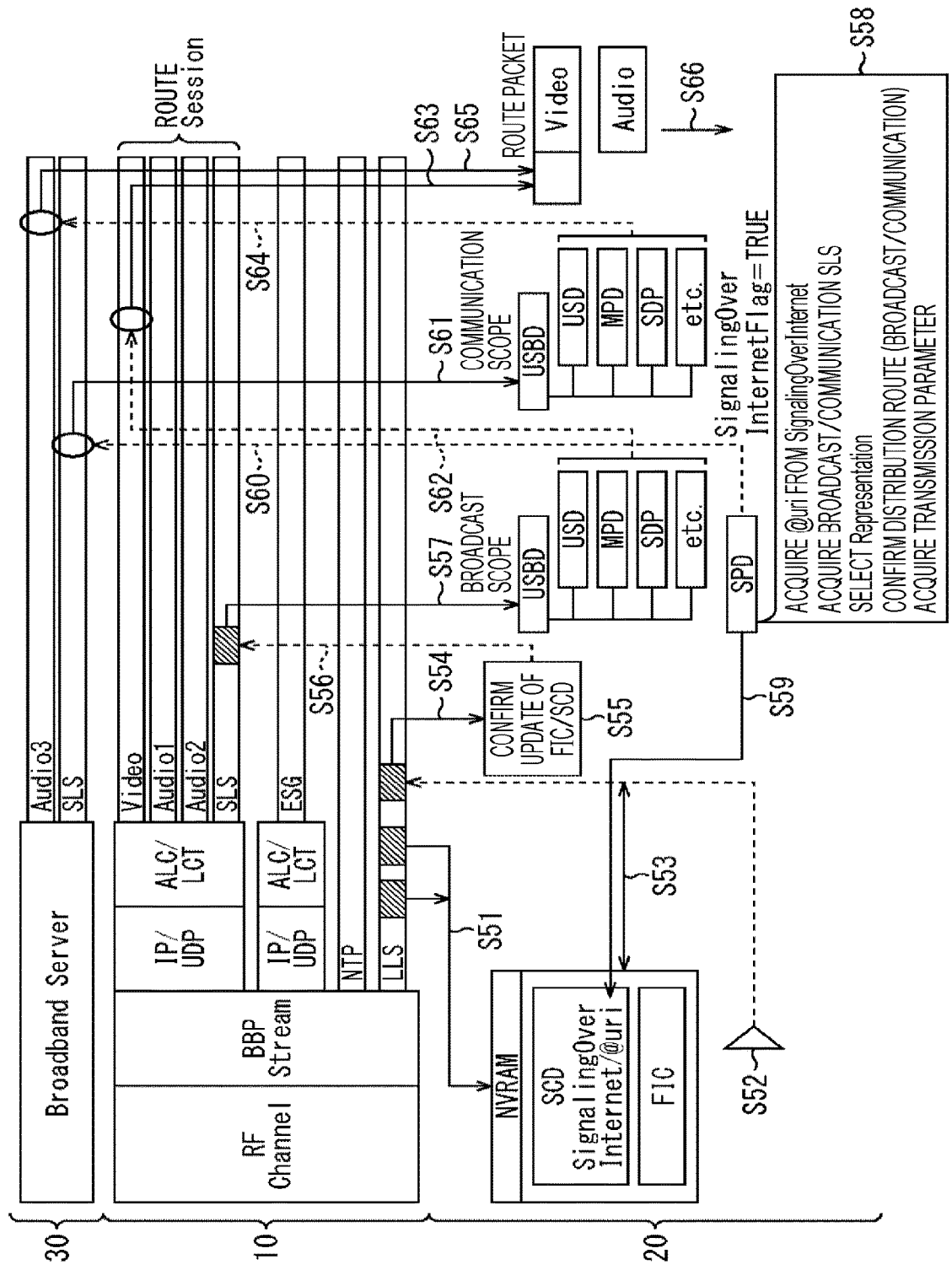
FIG. 11 is a sequence diagram of hybrid service 2.

FIG. 11 is a sequence diagram for explaining a specific flow of processing in the receiver 20 when exemplary application 3 for providing a hybrid service is employed. Incidentally, in exemplary application 3, both the broadcast SLS and the communication SLS are distributed, and the information on all the components configuring a hybrid service is described in the broadcast SLS and the communication SLS.

Additionally, FIG. 11 illustrates a flow of data transmitted from the transmitter 10 and the broadband server 30 on the upper side and illustrates a flow of processing in the receiver 20 for processing the data on the lower side. Further, a direction of time is assumed to be from the left side to the right side in FIG. 11.

In FIG. 11, the transmitter 10 transmits a broadcast wave (RF Channel) of digital broadcasting in the IP transmission system. The streams of the broadcast components, the SLS signaling data (broadcast SLS), the ESG data, the NTP data and the LLS signaling data configuring the hybrid service (such as program) are transmitted in the BBP stream on the broadcast wave. Incidentally, the streams of video data (Video), audio data (Audio1, Audio2) as broadcast components, and the SLS signaling data configuring the hybrid service are transmitted in the same ROUTE session.

Further, in FIG. 11, the broadband server 30 streams audio data (Audio3) as communication component and the SLS signaling data (communication SLS) via the Internet 90.

The receiver 20 acquires and records FIC and SCD transmitted in the LLS stream in NVRAM in the initial scan processing (S51). When a service is tuned by a user operation or the like, the receiver 20 reads FIC and SCD recorded in NVRAM thereby to acquire the tuning information corresponding to the service ID of the service to be tuned and to start the tuning processing (S52, S53). In the tuning processing, update of FIC and SCD transmitted in the LLS stream is first confirmed and the latest tuning information is recorded in NVRAM (S54, S55).

The receiver 20 then reads the SLS bootstrap information from a loop of the service to be tuned of the latest FIC recorded in NVRAM. Thereby, the receiver 20 can connect to the SLS stream transmitted in the ROUTE session according to the IP address, the port number and TSI included in the SLS bootstrap information, and can acquire the SLS signaling data (broadcast SLS) (S56, S57).

The SLS metadata such as USBD or SPD is acquired as broadcast SLS. Here, the SLS metadata such as USD, MPD or SDP is acquired with reference to USBD. Further, "TRUE" is designated for communication SLS flag information (SignalingOverInternetFlag attribute) in SPD. This means that the information on all the components is described for the broadcast SLS and the communication SLS. In exemplary application 3 of FIG. 11, the information on the broadcast components is described in the broadcast SLS, and the information on the communication component is described in the communication SLS, which corresponds to case 3 (FIG. 6) of the hybrid service described above.

Thus, the receiver 20 acquires the SLS broadband location information (uri attribute in SignalingOverInternet element) with reference to the communication SLS information (SignalingOverInternet element) of the latest SCD recorded in NVRAM (S58, S59). The receiver 20 then accesses the broadband server 30 via the Internet 90 according to URL indicated by the SLS broadband location information thereby to acquire the SLS signaling data (communication SLS) (S60, S61). The SLS metadata such as USBD, USD, MPD or SDP is acquired as communication SLS.

In this way, the receiver 20 acquires the broadcast SLS (corresponding to "broadcast scope" in the Figure) describing the information on the broadcast components therein and the communication SLS (corresponding to "communication scope" in the Figure) describing the information on the communication component therein as the SLS signaling data.

The receiver 20 matches URL of the stream of the component to be selected described in Representation element in MPD with URL described in deliveryMethod element in USD by use of the broadcast SLS thereby to specify that the component to be selected in the broadcast SLS is distributed via broadcast (S58). Thus, the receiver 20 connects to the stream of video configuring the service to be tuned which is transmitted in the ROUTE session according to the IP address, the port number, TSI and TOI included in the transmission parameters acquired by analyzing the SLS metadata such as SDP or LS ID in the broadcast SLS, and acquires the ROUTE packet (LCT packet) storing the video data therein (S62, S63).

Further, the receiver 20 matches URL of the stream of the component to be selected described in Representation element in MPD with URL described in deliveryMethod element in USD by use of the communication SLS thereby to specify that the component to be selected in the communication SLS is distributed via communication (S58). Thus, the receiver 20 accesses the broadband server 30 via the Internet 90 according to the segment URL of audio 3 as the communication component described in MPD of the communication SLS, and acquires (the packet storing therein) the streamed audio data (S64, S65).

The receiver 20 then performs the rendering processing thereby to reproduce the video and audio of a program corresponding to the service to be tuned (hybrid service) (S66).

As described above, in exemplary application 3, "TRUE" is designated for the communication SLS flag information (SignalingOverInternetFlag attribute) in SPD as broadcast SLS, and thus the receiver 20 connects to a stream of the broadcast components or the communication component by use of both the broadcast SLS and the communication SLS thereby to reproduce the video and audio of a program corresponding to the service to be tuned provided as hybrid service. At this time, the receiver 20 can confirm whether the communication SLS is provided in addition to the broadcast SLS with reference to the communication SLS flag information in SPD thereby to immediately acquire the required SLS signaling data and to efficiently acquire the component configuring the service to be tuned.

Incidentally, case 1 of FIG. 4 as hybrid service 1 and case 3 of FIG. 6 as hybrid service 2 have been described in exemplary applications 2 and 3 described above, but "TRUE" is designated for the communication SLS flag information in SPD in case 2 of FIG. 5 or case 4 of FIG. 7 similarly as in exemplary application 3 described above, and thus a stream of the broadcast components or the communication component is connected by use of both the broadcast SLS and the communication SLS. Further, there may be configured such that when both the broadcast SLS and the communication SLS are used, the broadcast SLS describing therein the basic part of the SLS signaling data is earlier distributed, and when the SLS signaling data is updated, the difference information is distributed in the communication SLS. Further, the information on all the components may be described in the communication SLS and a stream of the broadcast components or the communication component may be connected by use of only the communication SLS. In this case, the communication SLS is acquired by accessing the broadband server 30 via the Internet 90 according to URL of the SLS broadband location information or the like in SCD, for example.

4. Exemplary Syntax (Syntax of FIC)

FIG. 12 is a diagram illustrating exemplary syntax of FIC in the binary form.

Version information of the FIC protocol is designated in 8-bit FIC_protocol_version. A broadcast stream ID is designated in 16-bit Broadcast_stream_id.

1-bit SCD_exist_flag is an SCD flag indicating that SCD is present in the LLS stream. When the SCD flag indicates that SCD is present in the LLS stream, the BBP stream ID of the BBP stream in which the LLS stream is transmitted is designated as 8-bit Bbpstream_id next to the 7-bit reserved area. Further, version information of SCD is designated as 8-bit SCD_version.

FIC_level_descriptor( ) is a descriptor of the FIC level.

The number of services is designated in 8-bit num_services. A service loop is repeated depending on the number of services. The following contents are designated in the service loop.

A service ID is designated in 16-bit service_id. A BBP stream ID is designated in 8-bit bbpstream_id. A provider ID is designated in 16-bit provider_id. A service category is designated in 5-bit service_category. A category such as video, audio or ESG is designated, for example.

A length of a short service name is designated in 3-bit short_service_name_length. A short service name is designated in 16*m-bit short_service_name. Service status information indicating whether a service is being provided is designated in 3-bit service status. A flag indicating the version of an IP packet is designated in 1-bit IP_version_flag.

The number of classes is designated in 3-bit num_of_class. A class loop is repeated depending on the number of classes. The following contents for describing class information are designated in the class loop.

Additionally, the class information is used for providing one service in different classes to a plurality of different targets. For example, it is assumed that the same service (such as program) is distributed with high-robustness video at 2K resolution (resolution of about 2000 horizontal×1000 longitudinal pixels) and audio for mobile receivers under unstable reception environments, and with low-robustness video at 4K resolution (resolution of about 4000 horizontal× 2000 longitudinal pixels) and high-quality audio for fixed receives under stable reception environments.

Video stream layered coding is known as a service providing method of this kind, for example. With the layered coding, a video stream is divided into two or more layers, and the layers are combined thereby to generate a single high-quality video. For example, it is possible to distribute a low-quality video stream for base layer and to distribute additional information (information for improving resolution, frame rate, image quality, and the like, for example) for enhancing a video stream as base layer for enhancement layer. Thereby, the receiver 20 can reproduce not only a low-quality video (such as video with 2K resolution) corresponding to the base layer but also a high-quality video (such as video with 4K resolution) acquired by combining the base layer and the enhancement layer.

A class ID is designated in 8-bit class_id. "core," "enhance," or the like is designate in the class ID, for example. SLS version information is designated in 8-bit SLS version. Coding information indicating service protection is designated in 1-bit sp_indicator. For example, whether a video stream is coded is designated as the coding information, for example.

A flag indicating an IP address of a transmission source of an IP packet is designated in SLS_src_IP_addr_flag. When SLS_src_IP_addr_flag indicates that an IP address is present, the IP address of the transmission source is designated as 32-bit or 128-bit SLS_dst_IP_addr next to the 2-bit reserved area.

An IP address of a destination is designated in 32-bit or 128-bit SLS_dst_IP_addr. A port number is designated in 16-bit SLS_dst_port. TSI is designated in 16-bit SLS_TSI. The SLS bootstrap information is formed of the IP address, the port number, and TSI for acquiring the SLS signaling data.

SLS shortcut information is designated in 1-bit SLS_shortcut. The SLS shortcut information indicates whether a service described in FIC is a basic service or a rich service. For example, "TRUE" is designated for the basic service and "FALSE" is designated for the rich service for the SLS shortcut information.

Here, the basic service is a service capable of individually identifying a stream of a component configuring a service by the MIME type. Further, the rich service is a service other than the basic service. For example, the rich service includes a service in which any one component of video, audio, and subtitles is configured of two or more streams.

A reserved area with any bits is provided next to SLS_shortcut.

Additionally, the syntax of FIC described with reference to FIG. 12 is merely exemplary, and other syntax may be employed.

(Syntax of SCD)

FIG. 13 is a diagram illustrating exemplary syntax of SCD in the XML form. Additionally, attributes out of elements and attributes are denoted with "@" in FIG. 13. Further, the indented elements and attributes are designated for their upper elements.

As illustrated in FIG. 13, the SCD element as root element is an upper element of majorProtocolVersion attribute, minorProtocolVersion attribute, broadcaststreamId attribute, name attribute, Tuning_RF element, and Service element.

Protocol version information is designated for majorProtocolVersion attribute and minorProtocolVersion attribute. A broadcast stream ID of a broadcast station in units of physical channel is designated for broadcaststreamId attribute. A name of a broadcast station in units of physical channel is designated for name attribute.

Tuning information is designated for Tuning RF element. Tuning_RF element is an upper element of frequency attribute and preamble attribute. A frequency to tune a predetermined band is designated for frequency attribute. Control information of the physical layer is designated for preamble attribute.

Information on one or more services is designated for Service element. Service element is an upper element of serviceId attribute, globalUniqueServiceId attribute, longName attribute, and SignalingOverinternet element.

A service ID is designated for serviceId attribute. When information on a plurality of services is arranged, the services are identified by the service ID. A global unique service ID is designated for globalUniqueServiceId attribute. For example, an ESG-tuned service can be associated with USED by the global unique service ID. A name of a service identified by the service ID is designated for longName attribute.

Communication SLS information is designated for SignalingOverinternet element. Information on the SLS signaling data (communication SLS) distributed via communication is designated by the communication SLS information. SignalingOverinternet element is an upper element of uri attribute. Uniform resource identifier (URI) indicating a destination of the SLS signaling data (communication SLS) is designated as SLS broadband location information for uri attribute. Additionally, URI designated by the SLS broadband location information can be changed by updating SCD, but it is assumed to be fixed per service in actual operation, and thus it is assumed that query parameter or the like is added to URI to be transmitted to a server such as the broadband server 30 for dynamic parameters.

Additionally, in FIG. 13, only one element or attribute is always designated when cardinality is designated at "1," and any element or attribute is designated when cardinality is designated at "0 . . . 1." Further, when "1 . . . n" is designated, one or more elements or attributes are designated, and when "0 . . . n" is designated, one or more elements or attributes are arbitrarily designated. The relationship is applicable also to syntax of SPD in FIG. 14 described below.

Further, the syntax of SCD described with reference to FIG. 13 is merely exemplary, and other syntax may be employed.

(Syntax of SPD)

FIG. 14 is a diagram illustrating n exemplary syntax of SPD in the XML form. Additionally, a newly-defined element is indicated in bold in FIG. 14.

As illustrated in FIG. 14, SPD element as root element is an upper element of serviceId attribute, SignalingOverInternetFlag attribute, ContentAdvisoryDescription element and NRTServiceDescription element.

A service ID is designated for serviceId attribute. Communication SLS flag information is designated for SignalingOverinternetFlag attribute. For example, for the communication SLS flag information, "TRUE" is designated when both the broadcast SLS and the communication SLS need to be acquired, and "FALSE" is designated when only the broadcast SLS needs to be acquired. That is, when "TRUE" is designated as the communication SLS flag information, the fact means that the information on all the components is described for the broadcast SLS and the communication SLS, and when "FALSE" is designated as the communication SLS flag information, the fact means that the information on all the components is described in the broadcast SLS.

Information on rating is described for ContentAdvisoryDescription element. Information on non real time (NRT) service is described for NRTServiceDescription element. Additionally, the NRT service is a system for temporarily recording (a stream of a component configuring) a service distributed from the transmitter 10 to the receiver 20 in a storage and reproducing it therefrom.

Note that the syntax of SPD described with reference to FIG. 14 is merely exemplary, and other syntax may be employed.

5. Configuration of Each Apparatus Configuring System

The detailed configurations of the transmitter 10, the receiver 20, and the broadband server 30 configuring the service providing system 1 of FIG. 1 will be described below with reference to FIGS. 15 to 18.

Exemplary Configuration of Transmitter

Figure 15:
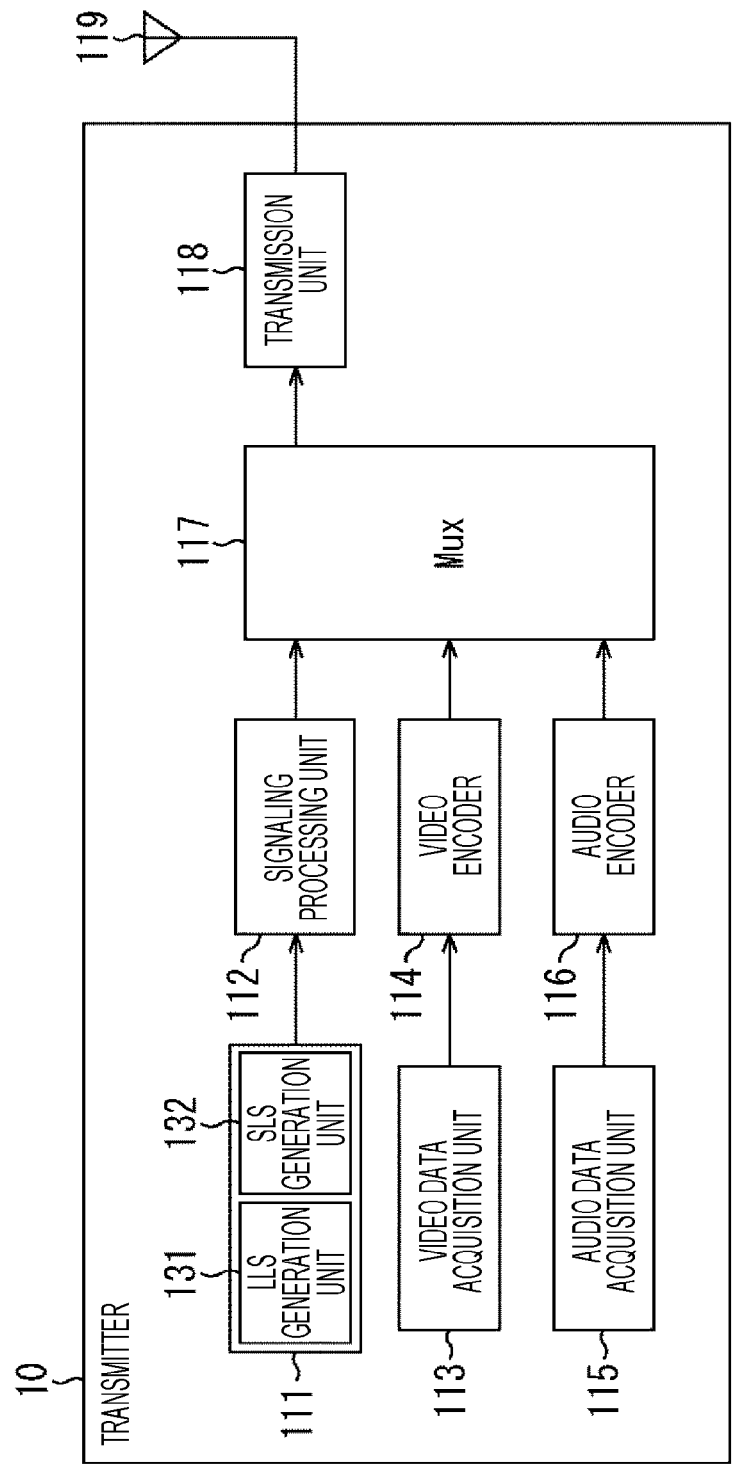
FIG. 15 is a diagram illustrating a configuration of one embodiment of a transmitter to which the present technology is applied.

FIG. 15 is a diagram illustrating a configuration of one embodiment of the transmitter to which the present technology is applied.

As illustrated in FIG. 15, the transmitter 10 is configured of a signaling generation unit 111, a signaling processing unit 112, a video data acquisition unit 113, a video encoder 114, an audio data acquisition unit 115, an audio encoder 116, a multiplexer (Mux) 117, and a transmission unit 118. The signaling generation unit 111 is further configured of an LLS generation unit 131 and an SLS generation unit 132.

The signaling generation unit 111 acquires raw data for generating signaling data from an external server, an incorporated storage, or the like. The signaling generation unit 111 generates signaling data by use of the raw data of the signaling data and supplies it to the signaling processing unit 112.

Here, LLS signaling data made of LLS metadata such as FIC or SCD is generated by the LLS generation unit 131 and SLS signaling data made of SLS metadata such as USBD or SPD is generated by the SLS generation unit 132 for the signaling data. The signaling processing unit 112 processes the signaling data supplied from the signaling generation unit 111, and supplies it to the multiplexer 117.

The video data acquisition unit 113 acquires video data as broadcast component provided from an external server, an incorporated storage, a video camera, or the like, and supplies it to the video encoder 114. The video encoder 114 encodes the video data supplied from the video data acquisition unit 113 according to an encoding system such as moving picture experts group (MPEG), and supplies the encoded video data to the multiplexer 117.

The audio data acquisition unit 115 acquires audio data as broadcast component provided from an external server, an incorporated storage, a microphone, or the like, and supplies it to the audio encoder 116. The audio encoder 116 encodes the audio data supplied from the audio data acquisition unit 115 according to an encoding system such as MPEG, and supplies the encoded audio data to the multiplexer 117.

The multiplexer 117 multiplexes a stream of the signaling data from the signaling processing unit 112, a video stream from the video encoder 114, and an audio stream from the audio encoder 116 thereby to generate and supply a BBP stream to the transmission unit 118. The transmission unit 118 transmits the BBP stream supplied from the multiplexer 117 as a broadcast wave (digital broadcast signal) of digital broadcasting in the IP transmission system via an antenna 119.

Exemplary Configuration of Receiver

Figure 16:
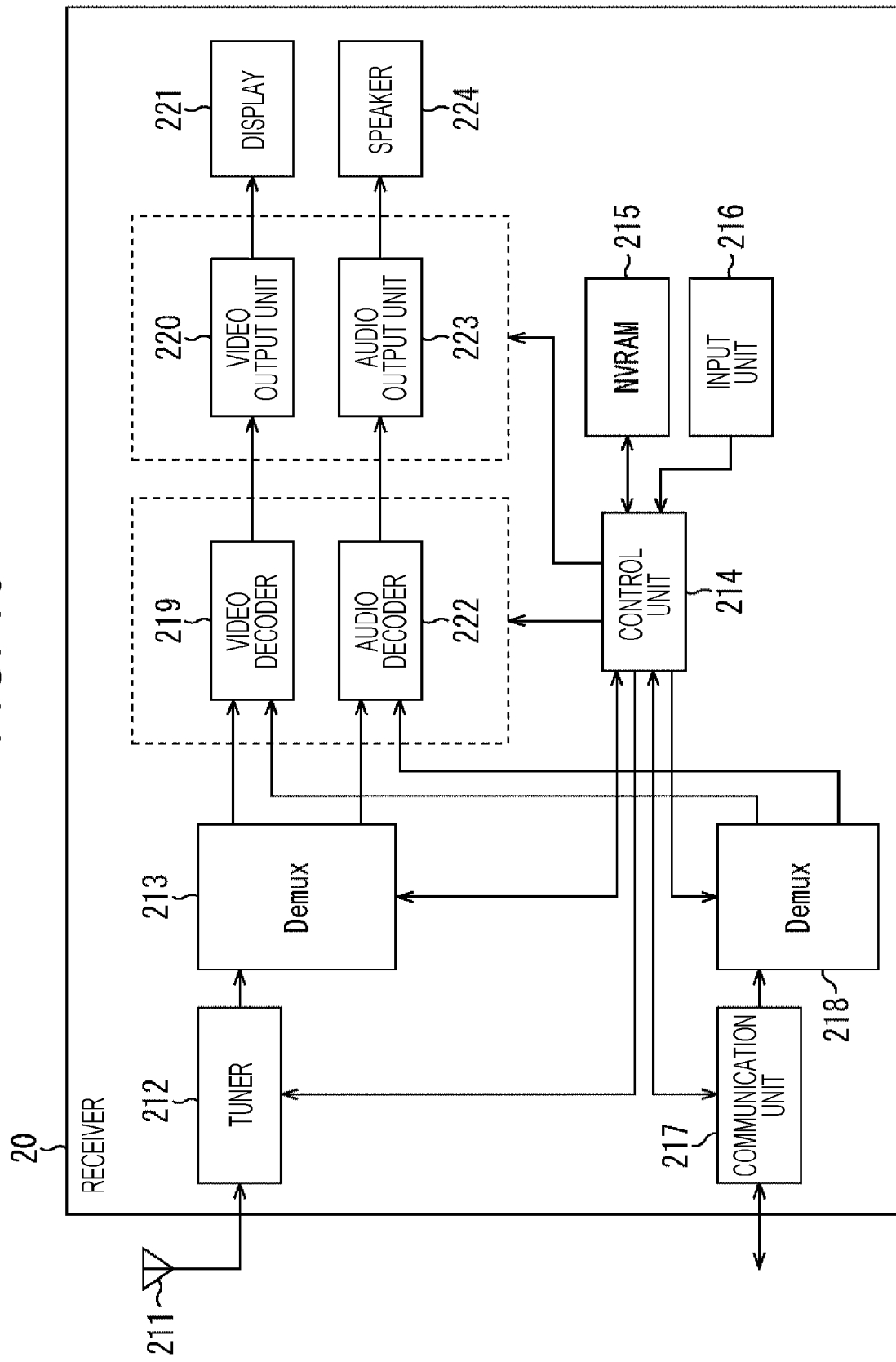
FIG. 16 is a diagram illustrating a configuration of one embodiment of a receiver to which the present technology is applied.

FIG. 16 is a diagram illustrating a configuration of one embodiment of the receiver to which the present technology is applied.

As illustrated in FIG. 16, the receiver 20 is configured of a tuner 212, a demultiplexer (Demux) 213, a control unit 214, NVRAM 215, an input unit 216, a communication unit 217, a demultiplexer (Demux) 218, a video decoder 219, a video output unit 220, a display 221, an audio decoder 222, an audio output unit 223, and a speaker 224.

The tuner 212 extracts and demodulates a digital broadcast signal depending on a user's service tuning operation from the broadcast wave (digital broadcast signal) of digital broadcasting in the IP transmission system received via an antenna 211 under control of the control unit 214, and supplies the demultiplexer 213 with a resultant BBP stream.

The demultiplexer 213 separates the BBP stream supplied from the tuner 212 into video data, audio data, and signaling data as components under control of the control unit 214. The demultiplexer 213 supplies the video data, the audio data, and the signaling data to the video decoder 219, the audio decoder 222, and the control unit 214, respectively.

The control unit 214 controls the operations of each unit in the receiver 20. Further, the control unit 214 connects to a stream of a component distributed via broadcast or via communication on the basis of the signaling data supplied from the demultiplexer 213 or the communication unit 217, and controls the operations of each unit in order to control reproduction of the component. Additionally, a detailed configuration of the control unit 214 will be described below with reference to FIG. 17.

The NVRAM 215 is nonvolatile memory, and stores various items of data therein under control of the control unit 214. The input unit 216 supplies an operation signal to the control unit 214 in response to a user operation.

The communication unit 217 accesses the broadband server 30 via the Internet 90 thereby to request to distribute a stream of a component under control of the control unit 214. The communication unit 217 receives the stream of the component streamed from the broadband server 30 via the Internet 90 and supplies it to the demultiplexer 218. Further, the communication unit 217 receives the data such as SLS signaling data from the broadband server 30 via the Internet 90 under control of the control unit 214, and supplies it to the control unit 214.

The demultiplexer 218 separates the stream of the component supplied from the communication unit 217 into video data and audio data under control the control unit 214, and supplies the video data and the audio data to the video decoder 219 and the audio decoder 222, respectively.

The video decoder 219 is supplied with the video data from the demultiplexer 213 or the demultiplexer 218. The video decoder 219 decodes the video data according to a decoding system such as MPEG and supplies the decoded video data to the video output unit 220 under control of the control unit 214. The video output unit 220 outputs the video data supplied from the video decoder 219 to the display 221. Thereby, the video of a program is displayed on the display 221, for example.

The audio decoder 222 is supplied with the audio data from the demultiplexer 213 or the demultiplexer 218. The audio decoder 222 decodes the audio data according to a decoding system such as MPEG and supplies the decoded audio data to the audio output unit 223 under control of the control unit 214. The audio output unit 223 outputs the audio data supplied from the audio decoder 222 to the speaker 224. Thereby, the audio corresponding to the video of the program is output from the speaker 224, for example.

Additionally, in FIG. 16, when being a set top box or the like, the receiver 20 may not have the display 221 or the speaker 224. Further, the receiver 20 may not have a communication function such as the communication unit 217. Further, a reproduction processing unit (player) is configured of the video decoder 219, the video output unit 220, the audio decoder 222, the audio output unit 223, and the control unit 214 for controlling them in the receiver 20.

Exemplary Functional Configuration of Control Unit

Figure 17:
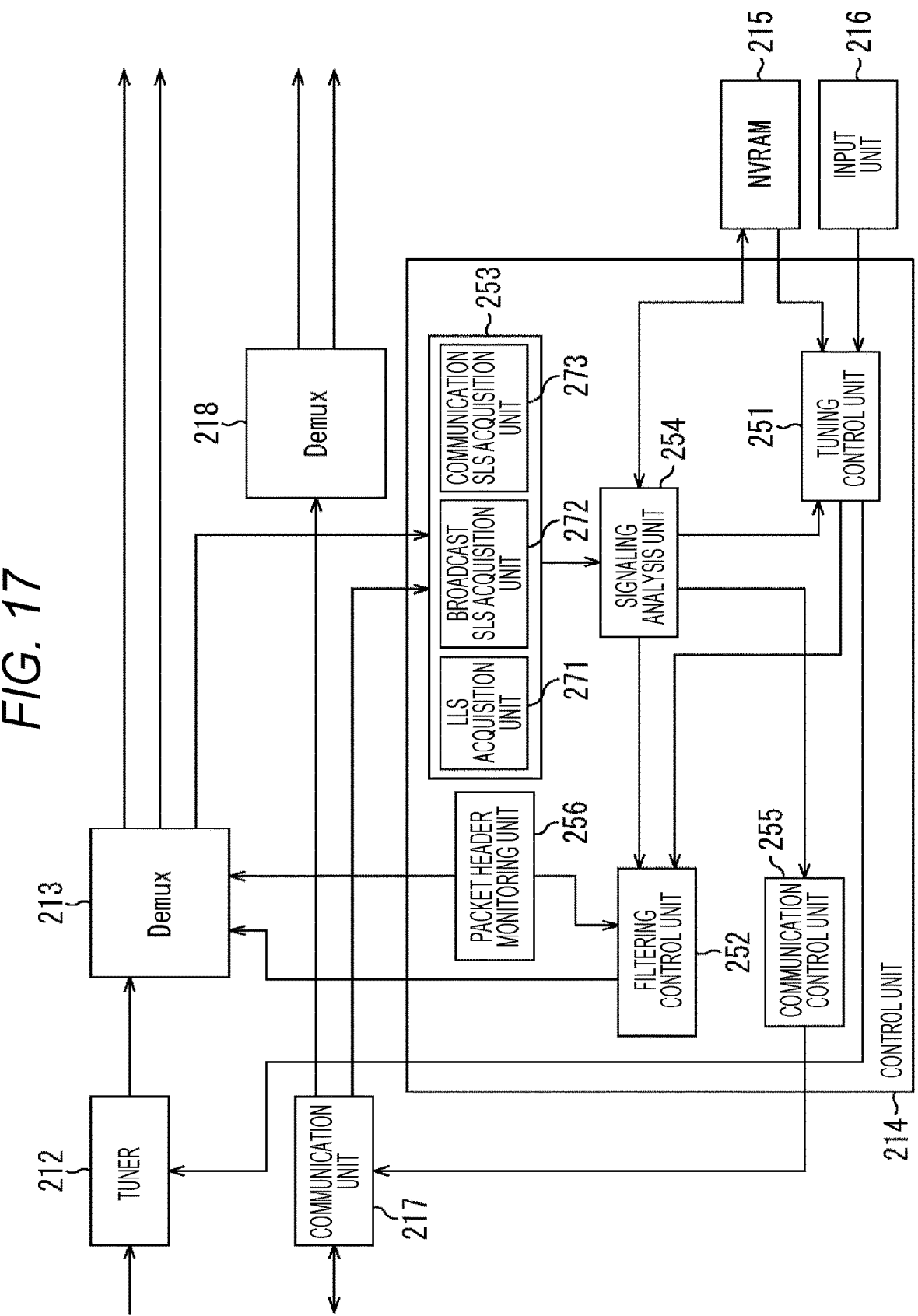
FIG. 17 is a diagram illustrating an exemplary functional configuration of a control unit of FIG. 16.

FIG. 17 is a diagram illustrating an exemplary functional configuration of the parts for controlling the initial scan processing, the tuning processing, the filtering processing and the communication processing in the control unit 214 of FIG. 16.

In FIG. 17, the control unit 214 is configured of a tuning control unit 251, a filtering control unit 252, a signaling acquisition unit 253, a signaling analysis unit 254, a communication control unit 255, and a packet header monitoring unit 256. Further, the signaling acquisition unit 253 is configured of an LLS acquisition unit 271, a broadcast SLS acquisition unit 272, and a communication SLS acquisition unit 273.

The tuning control unit 251 controls the tuning processing performed by the tuner 212. The filtering control unit 252 controls the filtering processing performed by the demultiplexer 213.

During the initial scan processing, the tuning control unit 251 controls the tuner 212 and the filtering control unit 252 controls the demultiplexer 213 so that the LLS signaling data transmitted in the LLS stream is acquired by the LLS acquisition unit 271 and is supplied to the signaling analysis unit 254. The signaling analysis unit 254 records the tuning information acquired by analyzing the LLS signaling data (LLS metadata such as FIC or SCD) from the LLS acquisition unit 271 in the NVRAM 215.

When the user performs the service tuning operation, the tuning control unit 251 acquires the tuning information (FIC or SCD) recorded in the NVRAM 215 in response to an operation signal from the input unit 216. The tuning control unit 251 controls the tuning processing performed by the tuner 212 on the basis of the acquired tuning information. Further, the tuning control unit 251 supplies the SLS bootstrap information included in the tuning information (FIC) to the filtering control unit 252.

The filtering control unit 252 controls the filtering processing performed by the demultiplexer 213 on the basis of the SLS bootstrap information supplied from the tuning control unit 251. Thereby, when an SLS stream configuring the service to be tuned is connected and the stream is transmitted in the ROUTE session, the demultiplexer 213 extracts the SLS signaling data (broadcast SLS) from the LCT packet. The broadcast SLS acquisition unit 272 acquires the SLS signaling data (SLS metadata such as USBD or SPD for broadcast SLS) and supplies it to the signaling analysis unit 254.

The signaling analysis unit 254 analyzes the SLS signaling data (SLS metadata such as USBD or SPD for broadcast SLS) supplied from the broadcast SLS acquisition unit 272, and supplies the analysis result to the filtering control unit 252 or the communication control unit 255. That is, when the stream of the component configuring the service to be tuned is distributed via broadcast, the signaling analysis unit 254 specifies an IP address, a port number, TSI, and TOI for connecting to the stream of the component, and supplies them to the filtering control unit 252. Further, when the stream of the component configuring the service to be tuned is distributed via communication, the signaling analysis unit 254 supplies the information on the destination (such as URL) to the communication control unit 255.

The filtering control unit 252 controls the filtering processing performed by the demultiplexer 213 on the basis of the IP address, the port number, TSI, and TOI supplied from the signaling analysis unit 254. Thereby, the demultiplexer 213 performs the filtering processing on the LCT packet and extracts the segment data from the resultant LCT packet. Then, the resultant video data is supplied to the video decoder 219 and the resultant audio data is supplied to the audio decoder 222.

The communication control unit 255 controls the communication processing performed by the communication unit 217 on the basis of the information on the destination (such as URL) supplied from the signaling analysis unit 254. Thereby, the communication unit 217 receives the stream of the component streamed from the broadband server 30 via the Internet 90, and supplies it to the demultiplexer 218. The demultiplexer 218 then supplies the video data and the audio data acquired from the stream supplied from the communication unit 217 to the video decoder 219 and the audio decoder 222, respectively.

Further, the communication control unit 255 controls the communication processing performed by the communication unit 217 on the basis of the SLS broadband location information (such as URL) supplied from the signaling analysis unit 254. Thereby, the communication unit 217 receives the SLS signaling data (communication SLS) distributed from the broadband server 30 via the Internet 90. The SLS signaling data received by the communication unit 217 is then acquired by the communication SLS acquisition unit 273 and is supplied to the signaling analysis unit 254. The signaling analysis unit 254 analyzes the SLS signaling data (SLS metadata such as USED for communication SLS) supplied from the communication SLS acquisition unit 273, and supplies the analysis result to the filtering control unit 252 or the communication control unit 255. Thereby, the filtering control unit 252 or the communication control unit 255 performs a similar processing to the above processing, and consequently acquires the video data and the audio data.

The packet header monitoring unit 256 monitors a packet transmitted in the BBP stream by the demultiplexer 213, and analyzes the header of the packet to be monitored. The packet header monitoring unit 256 controls the filtering control unit 252 according to the packet header analysis result, and causes the signaling acquisition unit 253 to acquire the LLS metadata or SLS metadata acquired from the packet meeting a specific condition. Additionally, filtering is performed in the filtering processing under a specific condition of at least one of compression information (Compression Scheme), type information (Fragment Type), extension type information (Type Extension), and version information, for example.

Exemplary Configuration of Broadband Server

Figure 18:
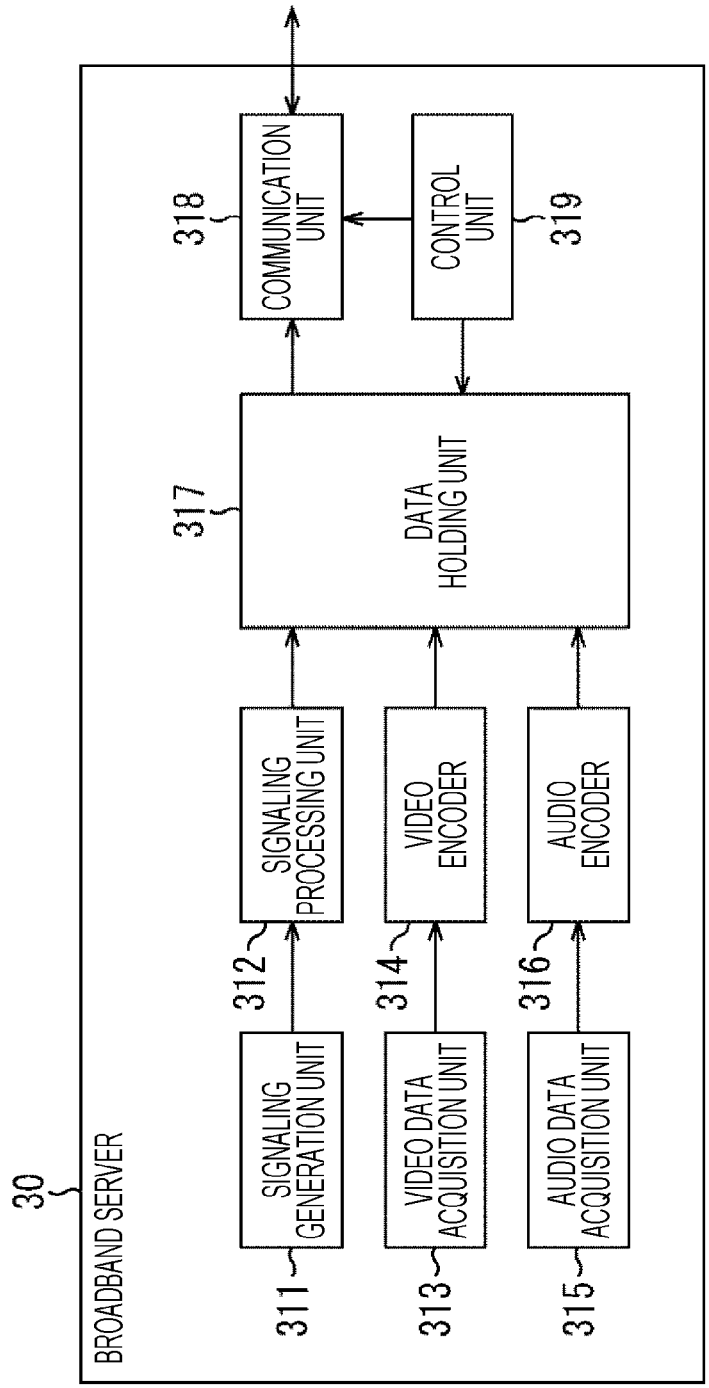
FIG. 18 is a diagram illustrating a configuration of one embodiment of a broadband server to which the present technology is applied.

FIG. 18 is a diagram illustrating a configuration of one embodiment of the broadband server to which the present technology is applied.

As illustrated in FIG. 18, the broadband server 30 is configured of a signaling generation unit 311, a signaling processing unit 312, a video data acquisition unit 313, a video encoder 314, an audio data acquisition unit 315, an audio encoder 316, a data holding unit 317, a communication unit 318, and a control unit 319.

The signaling generation unit 311 acquires raw data for generating SLS signaling data (communication SLS) from an external server, an incorporated storage, or the like. The signaling generation unit 311 generates the SLS signaling data (communication SLS) by use of the raw data of the SLS signaling data and supplies it to the signaling processing unit 312.

The signaling processing unit 312 processes the SLS signaling data (communication SLS) supplied from the signaling generation unit 311 and holds it in the data holding unit 317. Here, SLS metadata such as USBD or SPD is generated as the SLS signaling data (communication SLS).

The video data acquisition unit 313 acquires the video data as communication component provided from an external server, an incorporated storage, a video camera, or the like, and supplies it to the video encoder 314. The video encoder 314 encodes the video data supplied from the video data acquisition unit 313 in an encoding system such as MPEG, and holds the encoded video data in the data holding unit 317.

The audio data acquisition unit 315 acquires the audio data as communication component provided from an external server, an incorporated storage, a microphone, or the like, and supplies it to the audio encoder 316. The audio encoder 316 encodes the audio data supplied from the audio data acquisition unit 315 according to an encoding system such as MPEG, and holds the encoded audio data in the data holding unit 317.

The data holding unit 317 holds the SLS signaling data (communication SLS) from the signaling processing unit 312, the video data from the video encoder 314, and the audio data from the audio encoder 316 under control of the control unit 319.

The communication unit 318 makes communication with the receiver 20 via the Internet 90 under control of the control unit 319. The communication unit 318 reads the SLS signaling data (communication SLS), the video data, or the audio data held in the data holding unit 317 and transmits it to the receiver 20 as request source via the Internet 90 in response to a request from the receiver 20.

Additionally, FIG. 18 illustrates that both the streams of the communication components and the SLS signaling data (communication SLS) are distributed via the same broadband server 30, but the streams of the communication components and the SLS signaling data (communication SLS) may be distributed via different servers. Further, the broadband server 30 may distribute only one communication component out of video data and audio data.

6. Flow of Processing Performed in Each Apparatus

A specific flow of processing performed in each apparatus configuring the service providing system 1 of FIG. 1 will be described below with reference to the flowcharts of FIGS. 19 to 24.

(Transmission Processing)

A flow of the transmission processing performed by the transmitter 10 will be first described with reference to the flowchart of FIG. 19.

In step S111, the signaling generation unit 111 generates signaling data by use of raw data of the signaling data and supplies it to the signaling processing unit 112. In step S112, the signaling processing unit 112 processes the signaling data supplied from the signaling generation unit 111, and supplies it to the multiplexer 117.

Here, the LLS generation unit 131 generates LLS signaling data including LLS metadata such as FIC or SCD. Further, the SLS generation unit 132 generates SLS metadata such as USBD or SPD. Incidentally, the signaling data may be generated by an external server. In this case, the signaling generation unit 111 supplies the signaling data supplied from an external server to the signaling processing unit 112 without changing the signaling data.

In step S113, the video data acquisition unit 113 acquires the video data as broadcast component from an external server or the like, and supplies it to the video encoder 114. Further in step S113, the audio data acquisition unit 115 acquires the audio data as broadcast data from an external server or the like, and supplies it to the audio encoder 116.

In step S114, the video encoder 114 encodes the video data as broadcast component supplied from the video data acquisition unit 113 according to an encoding system such as MPEG, and supplies the encoded video data to the multiplexer 117. Further in step S114, the audio encoder 116 encodes the audio data as broadcast component supplied from the audio data acquisition unit 115 according to an encoding system such as MPEG, and supplies the encoded audio data to the multiplexer 117.

In step S115, the multiplexer 117 multiplexes the signaling data from the signaling processing unit 112, the video stream from the video encoder 114, and the audio stream from the audio encoder 116 thereby to generate and supply a BBP stream to the transmission unit 118.

In step S116, the transmission unit 118 transmits the BBP stream supplied from the multiplexer 117 as digital broadcast signal via the antenna 119. When the processing in step S116 ends, the transmission processing of FIG. 19 ends.

Figure 19:
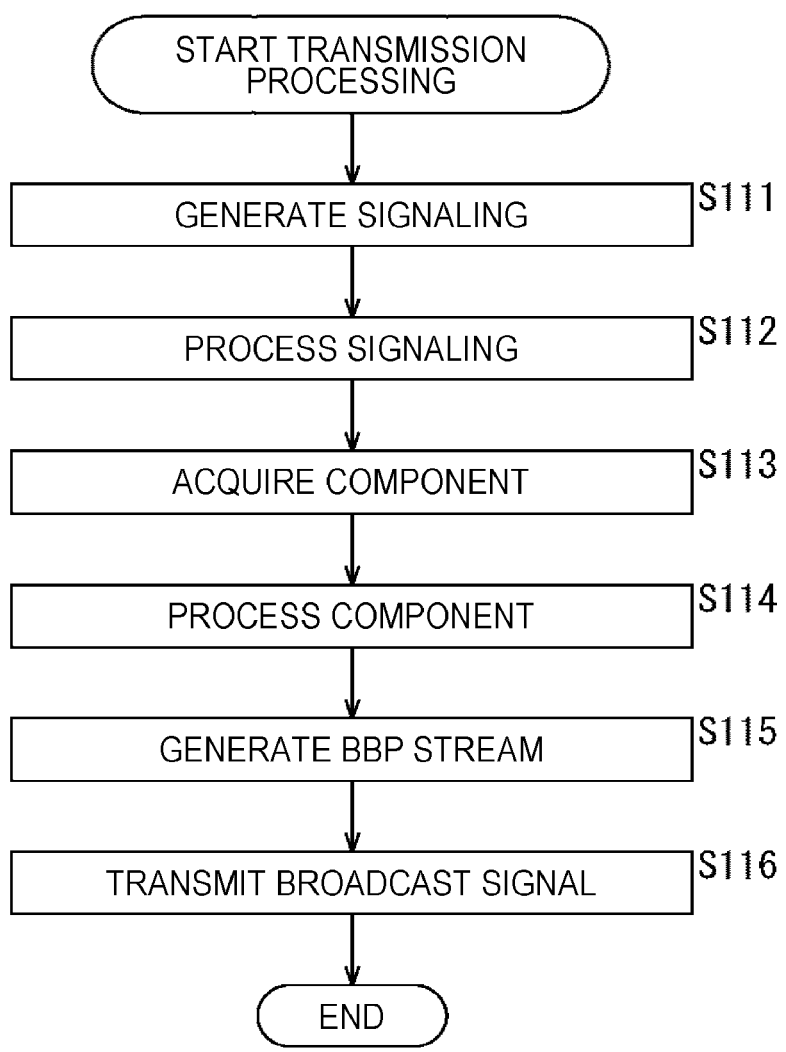
FIG. 19 is a flowchart for explaining transmission processing.

Additionally, in the transmission processing of FIG. 19, when a stream of a broadcast component such as video or audio is transmitted in the ROUTE session, a file of each component is divided into segments according to the ISO BMFF definition, and the resultant segment data is stored in an LCT packet to be transmitted.

Further, in the digital broadcast signal, the filtering information such as compression information (Compression Scheme), type information (Fragment Type), extension type information (Type Extension), and version information can be arranged in the LLS header of the LLS packet storing the LLS signaling data (LLS metadata such as FIC or SCD) therein or the LCT header of the LCT packet storing the SLS signaling data (metadata such as USBD or SPD) therein.

The flow of the transmission processing has been described above.

(Frequency Scan Processing)

Figure 20:
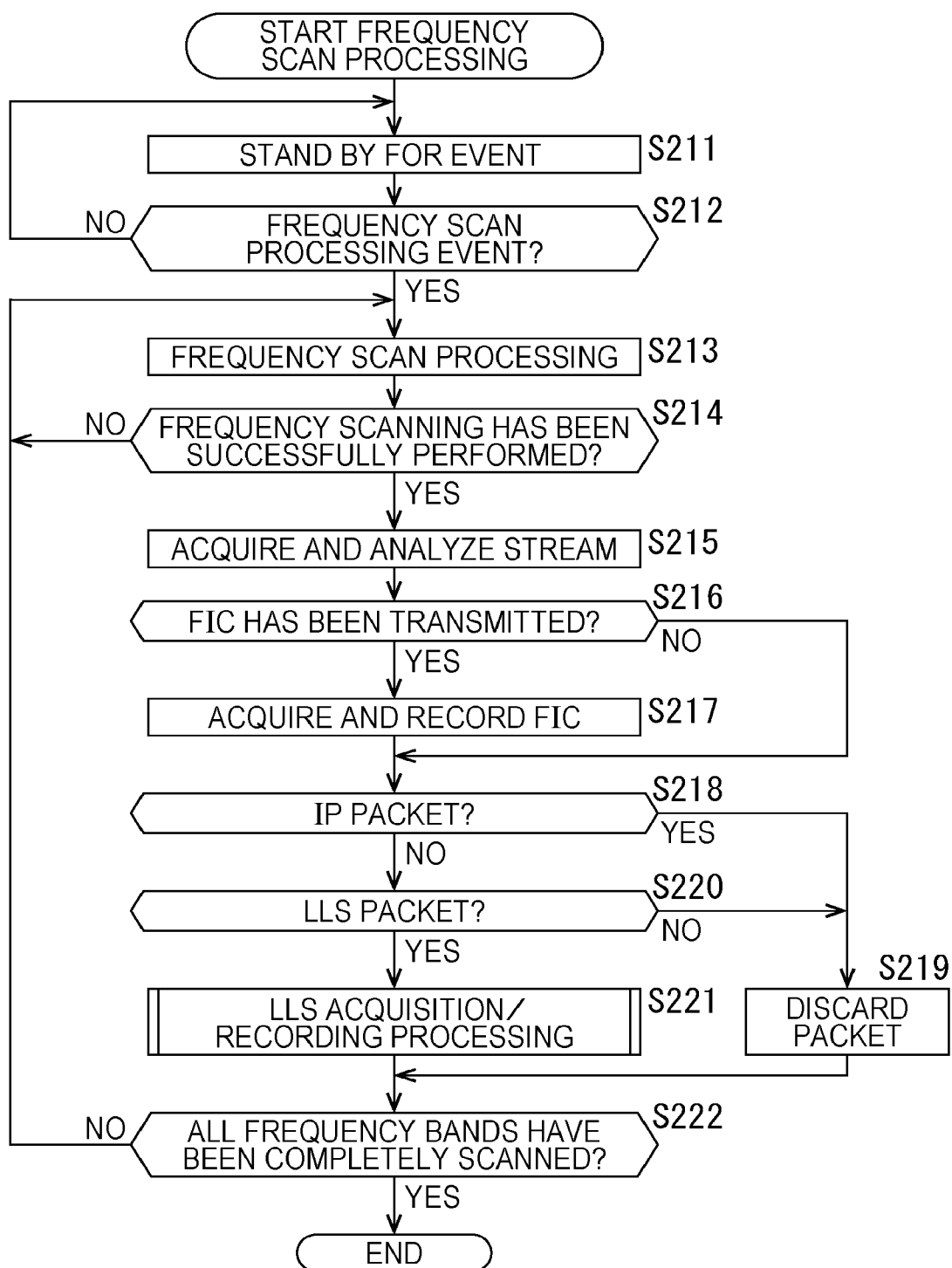
FIG. 20 is a flowchart for explaining frequency scan processing.

A flow of the frequency scan processing performed by the receiver 20 will be described below with reference to the flowchart of FIG. 20.

In step S211, the control unit 214 monitors an operation signal and the like from the input unit 216, and stands by for a frequency scan processing event to occur. Then in step S212, when it is determined that the frequency scan processing event has occurred, the processing proceeds to step S213.

In step S213, the tuner 212 performs the frequency scan processing under control of the tuning control unit 251. In step S214, a determination is made as to whether the frequency scanning has been success fully performed in the frequency scan processing in step S213.

In step S214, when it is determined that the frequency scanning has failed, the processing returns to the processing in step S213, where the frequency scan processing is performed again. On the other hand, in step S214, when it is determined that the frequency scan processing has been successfully performed, the processing proceeds to step S215.

In step S215, the demultiplexer 213 acquires and analyzes the BBP stream supplied from the tuner 212 under control of the filtering control unit 252. In step S216, a determination is made as to whether FIC has been transmitted.

In step S216, when it is determined that FIC has been transmitted, the processing proceeds to step S217. In step S217, FIC is acquired and recorded in the NVRAM 215. Additionally in step S216, when it is determined that FIC has not been transmitted, the processing in step S217 is skipped and the processing proceeds to step S218.

In step S218, a determination is made as to whether an IP packet has been extracted from the BBP stream according to the analysis result in step S215.

In step S218, when it is determined that the IP packet has been extracted, the processing proceeds to step S219. In step S219, the demultiplexer 213 discards the extracted IP packet. On the other hand, in step S218, when it is determined that a packet other than the IP packet has been extracted, the processing proceeds to step S220.

In step S220, a determination is made as to whether the LLS packet has been extracted from the BBP stream according to the analysis result in step S215.

In step S220, when it is determined that a packet other than the LLS packet has been extracted, the processing proceeds to step S219. In step S219, the demultiplexer 213 discards the packets other than the extracted LLS packet. On the other hand, in step S220, when it is determined that the LLS packet has been extracted, the processing proceeds to step S221.

In step S221, the demultiplexer 213 and the control unit 214 perform the LLS acquisition/recording processing. In the LLS acquisition/recording processing, the filtering processing is performed on the basis of the filtering information of the LLS header added to the LLS packet, and the LLS signaling data (LLS metadata such as SCD) acquired in the filtering processing is recorded as tuning information in the NVRAM 215. Additionally, the detailed contents of the LLS acquisition/recording processing will be described below with reference to the flowchart of FIG. 21.

When the processing in step S219 or step S221 ends, the processing proceeds to step S222. In step S222, a determination is made as to whether all the frequency bands have been completely scanned.

In step S222, when it is determined that all the frequency bands have not been completely scanned, the processing returns to the processing in step S213, and the processing in and subsequent to step S213 are repeatedly performed. Thereby, the scan processing is performed on each frequency band and the tuning information is recorded. Then in step S222, when it is determined that all the frequency bands have been completely scanned, the frequency scan processing of FIG. 20 ends.

The flow of the frequency scan processing has been described above.

(LLS Acquisition/Recording Processing)

Figure 21:
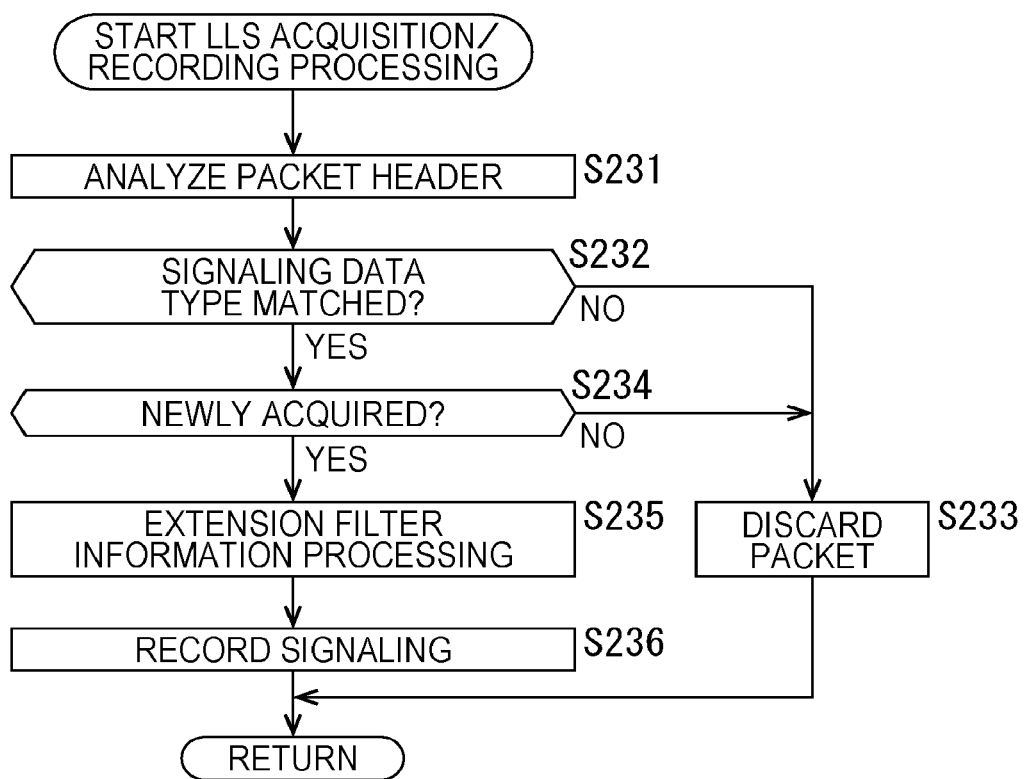
FIG. 21 is a flowchart for explaining LLS acquisition/recording processing.

The detailed contents of the LLS acquisition/recording processing corresponding to the processing in step S221 in FIG. 20 will be described below with reference to the flowchart of FIG. 21.

In step S231, the packet header monitoring unit 256 always monitors the LLS packet transmitted in the BBP stream by the demultiplexer 213, and analyzes the LLS header of the LLS packet to be monitored.

In step S232, the packet header monitoring unit 256 determines whether the type of the signaling data (LLS metadata) matches according to the analysis result in step S231. That is, the type information (Fragment Type) is arranged in the LLS header of the LLS packet, and thus the packet header monitoring unit 256 determines whether the LLS packet added with the LLS header arranging the type information of Type="000000" therein has been extracted, for example.

Additionally, a value depending on the type of the LLS metadata is designated for the type information (Fragment Type) in the LLS header. For example, "000000," "000001," "000010," and "000011" are designated for SCD, EAD, RRD, and DCD, respectively.

In step S232, when it is determined that the type of the signaling data (LLS metadata) is different, the processing proceeds to step S233. In step S233, the demultiplexer 213 discards the extracted LLS packet. On the other hand, in step S232, when it is determined that the type of the signaling data (LLS metadata) matches, the processing proceeds to step S234.

In step S234, the packet header monitoring unit 256 determines whether the current LLS signaling data (LLS metadata) has been newly acquired according to the analysis result in step S231. That is, the version information is arranged in the LLS header of the LLS packet, and thus the packet header monitoring unit 256 determines whether the LLS packet added with the LLS header arranging the version information on the latest version therein has been extracted.

In step S234, when it is determined that the current LLS signaling data (LLS metadata) has been acquired, the processing proceeds to step S233. In step S233, the demultiplexer 213 discards the extracted LLS packet. On the other hand, in step S234, when it is determined that the current LLS signaling data (LLS metadata) has been newly acquired, the processing proceeds to step S235.

In step S235, the packet header monitoring unit 256 performs an extension filter information (Filter Extension) processing according to the analysis result in step S231. That is, the extension type information is arranged in the LLS header of the LLS packet, and thus a determination is made as to whether the LLS packet added with the LLS header arranging therein the extension filter information meeting a predetermined specific condition such as current area or degree of emergency has been extracted in the extension filter information processing.

Additionally, the filtering control unit 252 controls the demultiplexer 213 thereby to perform the filtering processing on the LLS packet to be monitored under control of the packet header monitoring unit 256, and the LLS signaling data acquired from the LLS packet meeting a specific condition in the LLS packet to be monitored is acquired from the LLS acquisition unit 271.

In step S236, the signaling analysis unit 254 records the LLS signaling data (LLS metadata such as SCD) acquired by the LLS acquisition unit 271 in the NVRAM 215. Thereby, the tuning information acquired from the LLS signaling data (LLS metadata such as SCD) is recorded in the NVRAM 215. When the processing in step S233 or step S236 ends, the processing returns to the processing in step S221 in FIG. 20, and the subsequent processing are performed.

The flow of the LLS acquisition/recording processing has been described above.

(Pre-Tuning Processing)

A flow of the pre-tuning processing performed by the receiver 20 will be described below with reference to the flowchart of FIG. 22.

In step S251, the tuning control unit 251 monitors an operation signal and the like from the input unit 216, and stand by for a service tuning event to occur. Then in step S252, when it is determined that the service tuning even has occurred, the processing proceeds to step S253.

In step S253, the tuning control unit 251 acquires the service ID (channel number) corresponding to the tuned service. Further in step S254, the tuning control unit 251 determines whether the tuning information (FIC) has been recorded and acquired with reference to the NVRAM 215.

In step S254, when it is determined that the tuning information has been acquired, the processing proceeds to step S255. In step S255, the tuning control unit 251 reads and acquires the tuning information (FIC or SCD) recorded in the NVRAM 215.

On the other hand, in step S254, when it is determined that the tuning information has not been acquired, the processing proceeds to step S256. In step S256, the demultiplexer 213 and the control unit 214 acquire FIC from the LLS stream. Thereby, the control unit 214 acquires the tuning information (FIC or SCD) (S255). Additionally, FIC may be transmitted not in the LLS stream but in a lower hierarchy (layer) such as physical layer, and in this case, it is acquired therefrom.

In step S257, the tuner 212, the demultiplexer 213, the control unit 214, and the like perform the tuning processing based on the tuning information (FIC or SCD) acquired in the processing in step S255. Additionally, the detailed contents of the tuning processing will be described below with reference to the flowcharts of FIGS. 23 and 24.

The flow of the pre-tuning processing has been described above.

(Tuning Processing)

The detailed contents of the tuning processing corresponding to the processing in step S257 in FIG. 22 will be described below with reference to the flowchart of FIG. 23.

In step S271, the signaling analysis unit 254 reads FIC recorded in the NVRAM 215 and analyzes the class information described in FIC. Here, a determination is made as to which class of enhancement class or core class the receiver 20 (such as mobile receiver or fixed receiver) as target belongs to. The subsequent processing are then performed on the basis of the determination result.

In step S272, the control unit 214 confirms whether the receiver 20 has a communication function and the function is enabled if the communication function is provided, thereby determining whether the receiver 20 can receive only broadcast. In step S272, for example, when it is determined that the receiver 20 does not have a communication function such as the communication unit 217 and can receive only broadcast, the processing proceeds to step S273.

In step S273, the signaling analysis unit 254 determines whether "TRUE" is designated for the SLS shortcut information (SLS_shortcut) with reference to the tuning information (FIC) recorded in the NVRAM 215.

In step S273, when it is determined that "TRUE" is designated for the SLS shortcut information (SLS_shortcut), the processing proceeds to step S274, where the processing as basic service is performed. That is, in step S274, the broadcast SLS acquisition unit 272 acquires MPD and LSID (broadcast SLS) transmitted in the ROUTE session according to the result of the filtering processing performed by the demultiplexer 213. MPD and LSID acquired in the processing in step S274 are then analyzed by the signaling analysis unit 254 and the analysis result is supplied to the filtering control unit 252.

In step S275, the filtering control unit 252 controls the filtering processing performed by the demultiplexer 213 on the basis of the analysis result (IP address, port number, TSI, and TOI) supplied from the signaling analysis unit 254.

Thereby, the demultiplexer 213 performs the filtering processing on the LCT packet, extracts the segment data from the resultant LCT packet, and acquires (captures) the broadcast components configuring the tuned service. Further in step S276, a determination is made as to whether all the acquired components have been captured, and the processing in step S275 is repeatedly performed until all the components are captured so that the video data and the audio data configuring the tuned service are acquired (captured), for example.

Figure 22:
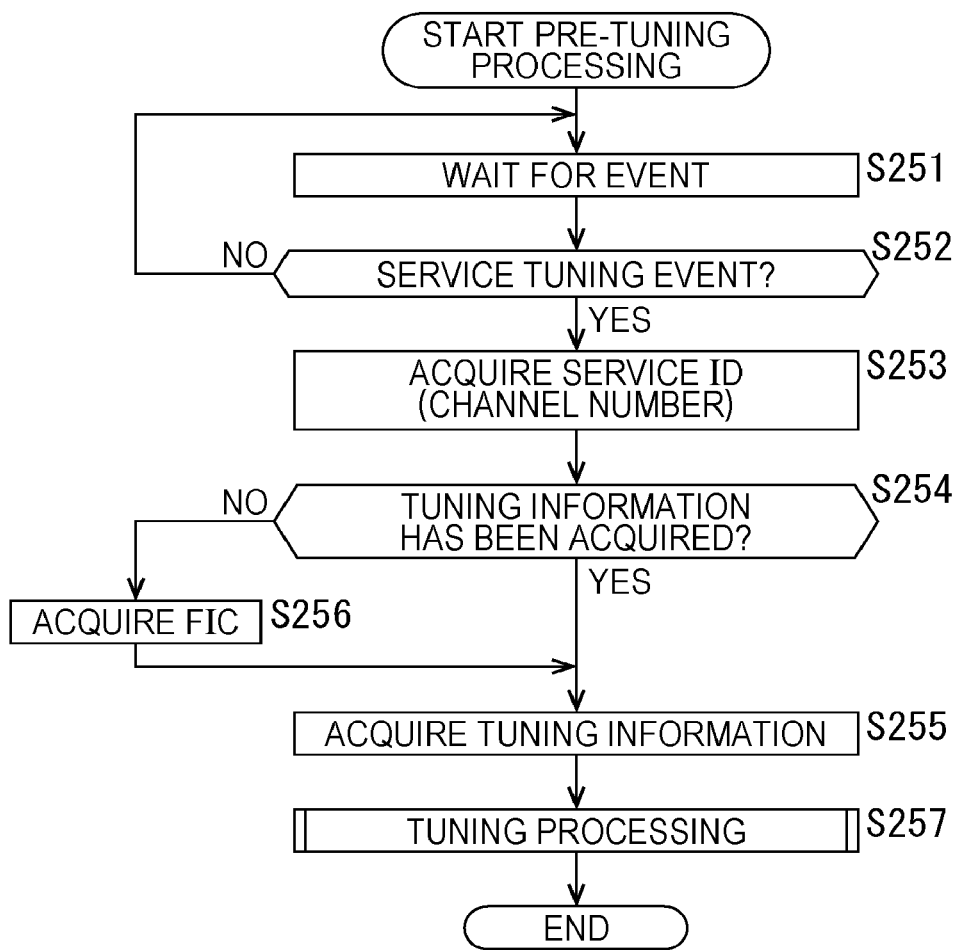
FIG. 22 is a flowchart for explaining pre-tuning processing.

Then, for example, the video data and the audio data acquired in the processing in step S275 are decoded and are subjected to the rendering processing or the like so that the video and audio of a program corresponding to the service tuned in the processing in step S252 in FIG. 22 are reproduced and the broadcast service starts being viewed (S284).

In this way, when "TRUE" is designated for the SLS shortcut information (SLS_shortcut) in FIC to be the basic service, a desired component can be acquired by use of MPD and LSID without referring to all the SLS metadata.

On the other hand, in step S273, when it is determined that "FALSE" is designated for the SLS shortcut information (SLS_shortcut), the processing proceeds to step S277, where the processing as rich service is performed. That is, in step S277, the broadcast SLS acquisition unit 272 acquires the SLS signaling data (broadcast SLS) such as USBD, USD, MPD or SDP transmitted in the ROUTE session according to the result of the filtering processing performed by the demultiplexer 213. SDP acquired in the processing in step S277 is then analyzed by the signaling analysis unit 254 and the analysis result is supplied to the filtering control unit 252.

In step S278, the signaling analysis unit 254 determines whether the distribution route is only via broadcast on the basis of the broadcast SLS analysis result. In step S278, when it is determined that the distribution route is not only via broadcast but also via communication, the processing proceeds to step S279. In step S279, the signaling analysis unit 254 limits the components to be selected to the components distributed via broadcast. When the processing in step S279 ends, the processing proceeds to step S280.

Additionally, in step S278, when it is determined that the distribution route is only via broadcast, the distribution route does not need to be limited to via broadcast, and thus the processing in step S279 is skipped and the processing proceeds to step S280.

In step S280, the signaling analysis unit 254 selects a component which configures the service to be tuned and is to be subjected to the rendering processing on the basis of the broadcast SLS analysis result.

In step S281, the broadcast SLS acquisition unit 272 acquires LSID (broadcast SLS) transmitted in the ROUTE session according to the result of the filtering processing performed by the demultiplexer 213. LSID acquired in the processing in step S281 is analyzed by the signaling analysis unit 254 and the analysis result is supplied to the filtering control unit 252.

In step S282, the filtering control unit 252 controls the filtering processing performed by the demultiplexer 213 on the basis of the analysis result (IP address, port number, TSI, and TOI) supplied from the signaling analysis unit 254.

Thereby, the demultiplexer 213 performs the filtering processing on the LCT packet, extracts the segment data from the resultant LCT packet, and acquires (captures) the broadcast components configuring the tuned service. Further in step S283, a determination is made as to whether all the acquired components have been captured, and the processing in step S282 is repeatedly performed until all the components are captured thereby to acquire (capture) the video data and the audio data configuring the tuned service, for example.

Then, for example, the video data and the audio data acquired in the processing in step S282 are decoded and are subjected to the rendering processing or the like so that the video and audio of a program corresponding to the service tuned in the processing in step S252 in FIG. 22 are reproduced and the broadcast service starts being viewed (S284).

In this way, when "FALSE" is designated for the SLS shortcut information (SLS_shortcut) in FIC to be the rich service, the destination of the components cannot be specified by only the contents described in MPD and LSID, and thus a desired component is acquired with reference to other SLS metadata such as USBD, USD, or SDP in addition to MPD and LSID. When the processing in step S284 ends, the processing returns to the processing in step S257 in FIG. 22 and the subsequent processing are performed.

Additionally, in step S272, when it is determined that the receiver 20 is for hybrid reception of broadcast and communication, the processing proceeds to step S285. In step S285, the tuning processing for hybrid reception of broadcast and communication is performed. Additionally, the detailed contents of the tuning processing for hybrid reception will be described below with reference to the flowchart of FIG. 24.

The flow of the tuning processing has been described above.

(Tuning Processing for Hybrid Reception)

The detailed contents of the tuning processing for hybrid reception corresponding to the processing in step S285 in FIG. 23 will be described below with reference to the flowchart of FIG. 24.

In step S291, the broadcast SLS acquisition unit 272 acquires the SLS signaling data (broadcast SLS) such as USBD or SPD transmitted in the ROUTE session according to the result of the filtering processing performed by the demultiplexer 213. The broadcast SLS acquisition unit 272 supplies the SLS signaling data (broadcast SLS) to the signaling analysis unit 254.

In step S292, the signaling analysis unit 254 analyzes SPD acquired in the processing in step S291, and determines whether the communication SLS flag information (SignalingOverInternetFlag attribute) is described and its value is designated at "TRUE."

In step S292, when "TRUE" is designated for SignalingOverInternetFlag attribute in SPD, the processing proceeds to step S293. In step S293, a determination is made as to whether the receiver 20 enables the communication function and is capable of hybrid reception.

Figure 23:
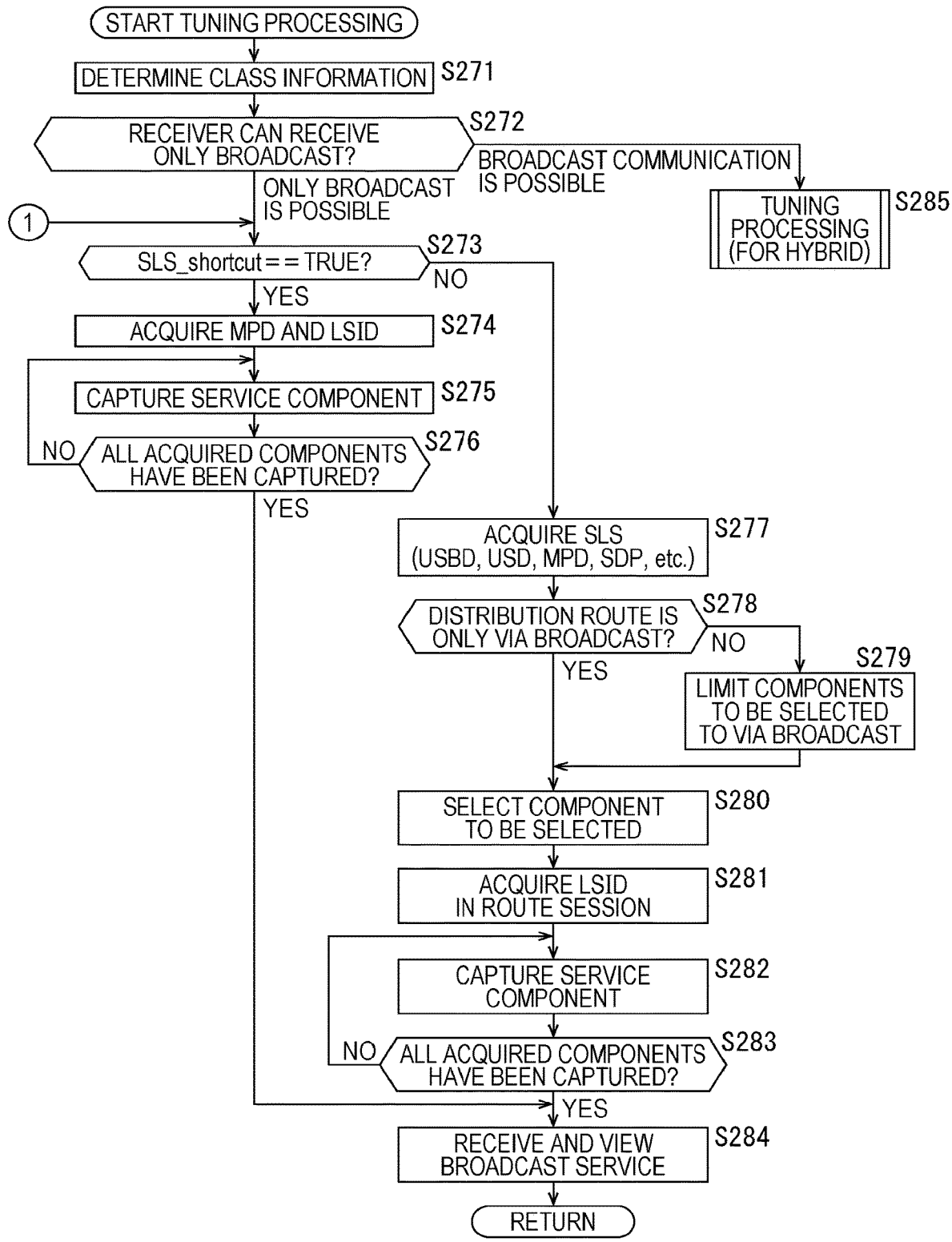
FIG. 23 is a flowchart for explaining tuning processing.
Figure 24:
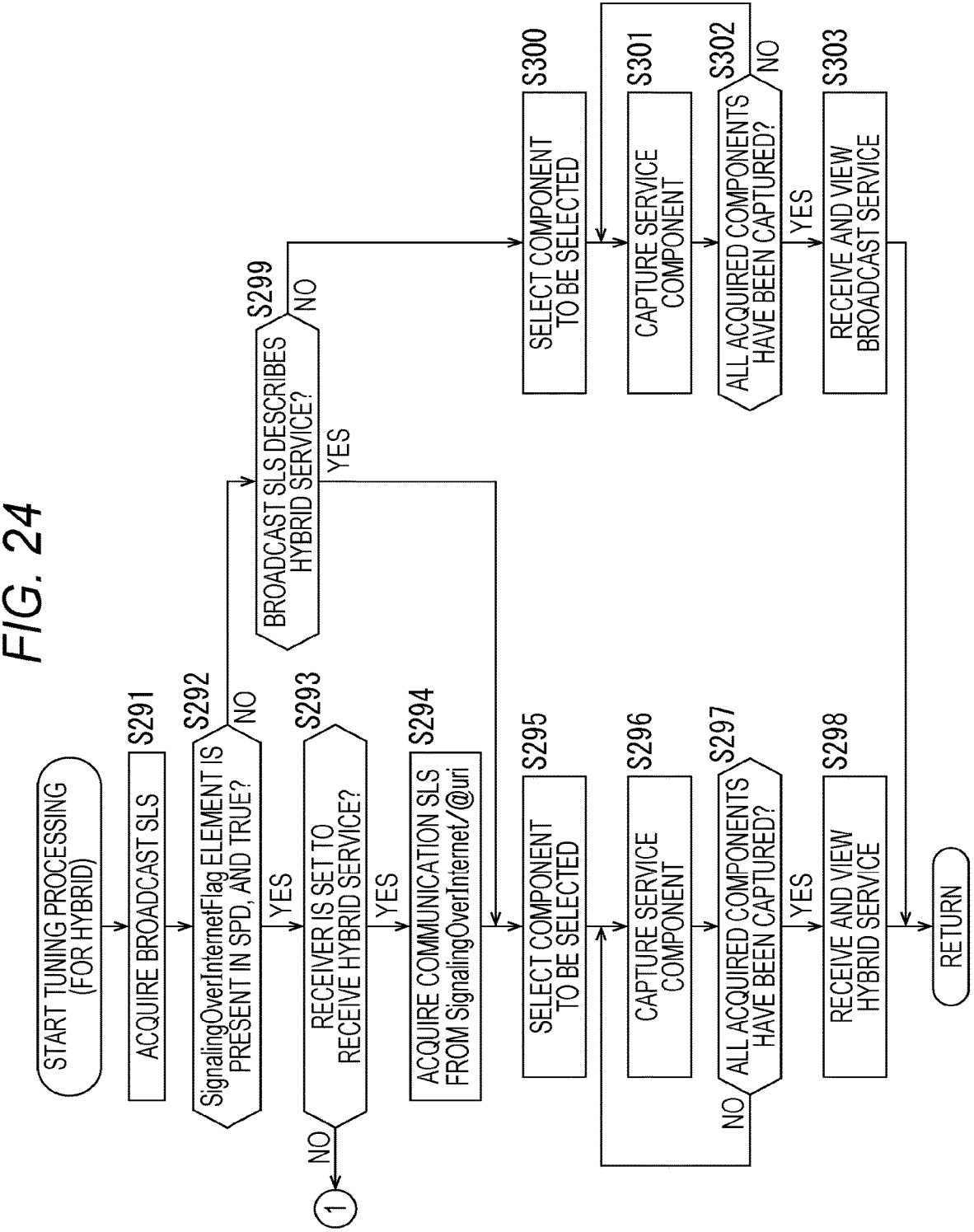
FIG. 24 is a flowchart for explaining hybrid-compatible tuning processing.

In step S293, when it is determined that the receiver 20 is not set to be capable of hybrid reception, the processing proceeds to step S273 in FIG. 23 and the subsequent processing are performed. That is, in this case, even the receiver 20 for hybrid reception does not use the communication function and performs a similar processing to the receiver 20 capable of only broadcast reception.

In step S293, when it is determined that the receiver 20 is set to be capable of hybrid reception, the processing proceeds to step S294. In step S294, the signaling analysis unit 254 acquires the SLS broadband location information (uri attribute) with reference to the communication SLS information (SignalingOverInternet element) in SCD, and supplies it to the communication control unit 255. The communication control unit 255 then controls the communication unit 217 according to URL indicated by the SLS broadband location information from the signaling analysis unit 254, and accesses the broadband server 30 via the Internet 90 thereby to receive the SLS signaling data (communication SLS) such as USBD. Thereby, the communication SLS acquisition unit 273 acquires the SLS signaling data (communication SLS) received by the communication unit 217, and supplies it to the signaling analysis unit 254.

In step S295, the signaling analysis unit 254 analyzes the broadcast SLS acquired in the processing in step S291 and the communication SLS acquired in the processing in step S294, and selects a component which configures the service to be tuned and is to be subjected to the rendering processing on the basis of the analysis result. Additionally, as described above, the case in which a stream of the broadcast components or the communication component is connected by use of both the broadcast SLS and the communication SLS in the hybrid service corresponds to case 2 to case 4 in FIGS. 5 to 7.

In step S296, the service component to be selected, which is selected in the processing in step S295, is captured. Specifically, for example, the signaling analysis unit 254 analyzes USD and MPD acquired in the processing in step S291 or step S294, and determines whether the distribution route of the stream of the component to be acquired is via broadcast or via communication depending on whether segment URL of MPD is described in broadcastAppService element or unicastAppService element of deliveryMethod element in USD.

Here, when it is determined that the distribution route of the component is via broadcast, the filtering control unit 252 controls the filtering processing performed by the demultiplexer 213 on the basis of the analysis result (IP address, port number, TSI, and TOI) supplied from the signaling analysis unit 254. Thereby, the demultiplexer 213 performs the filtering processing on the LCT packet, extracts the segment data from the resultant LCT packet, and acquires (captures) the broadcast components configuring the tuned service.

On the other hand, when it is determined that the distribution route of the component is via communication, the communication control unit 255 controls the communication unit 217 according to media segment information (segment URL) from the signaling analysis unit 254, and accesses the broadband server 30 via the Internet 90 thereby to acquire (capture) the communication component configuring the tuned service.

In this way, the processing in step S296 is performed, and the broadcast components or the communication component is captured as service component. When the processing in step S296 ends, the processing proceeds to step S297. In step S297, a determination is made as to whether all the acquired components have been captured, and the processing in step S296 is repeatedly performed until all the components are captured so that the video data and the audio data configuring the tuned service are acquired (captured), for example.

Then, for example, the video data and the audio data acquired in the processing in step S296 are decoded and subjected to the rendering processing or the like so that the video and audio of a program corresponding to the service tuned in the processing in step S252 in FIG. 22 are reproduced and the hybrid service starts being viewed (S298).

Further in step S292, it is determined that "FALSE" is designated for SignalingOverInternetFlag attribute in SPD, the destination of all the service components can be solved by only the broadcast SLS, and thus the processing proceeds to step S299. In step S299, the signaling analysis unit 254 analyzes the broadcast SLS acquired in the processing in step S291, and determines whether the broadcast SLS describes the information on the hybrid service therein on the basis of the analysis result. The determination processing employs the information capable of identifying a distribution route such as broadcastAppService element or unicastAppService element in deliveryMethod element in USD, or "a=" element in SDP, for example.

In step S299, when the broadcast SLS describes the information on the hybrid service therein, the hybrid service is provided, and thus the processing proceeds to step S295. Additionally, as described above, the case in which a stream of the broadcast components or the communication component is connected by use of only the broadcast SLS in the hybrid service corresponds to case 1 of FIG. 4. In this case, the similar processing to steps S295 to S298 described above are performed and the hybrid service starts being viewed (S298).

On the other hand, in step S299, when the broadcast SLS does not describe the information on the hybrid service therein, the broadcast service is provided, and thus the processing proceeds to step S300. Additionally, the case corresponds to the case of broadcast service of FIG. 3. In this case, the processing in steps S300 to S303 are performed and the broadcast service starts being viewed (S303).

When the processing in step S298 or step S303 ends, the processing returns to the processing in step S285 in FIG. 23, and the subsequent processing are performed.

The flow of the tuning processing for hybrid reception has been described above.

7. Variants

In the above description, digital broadcasting in the IP transmission system is expected to employ in ATSC3.0 as currently-developed next generation broadcast standard in the U.S., and thus ATSC as system employed in the U.S. and the like is described as a terrestrial digital TV broadcast standard, but digital broadcasting in the IP transmission system may be applied to integrated services digital broadcasting (ISDB) as system employed in Japan and the like, or digital video broadcasting (DVB) as system employed in nations in Europe. Further, digital broadcasting in the IP transmission system may be employed in satellite digital TV broadcasting or digital cable TV broadcasting, not limited to terrestrial digital TV broadcasting.

Further, in the above description, "D" standing for Description is used as a name of signaling data, but "T" standing for Table may be employed. For example, service configuration description (SCD) may be described as service configuration table (SCT). Further, for example, service parameter description (SPD) may be described as service parameter table (SPT). Incidentally, the difference between the names is a formal difference between "Description" and "Table," and the substantial contents of the signaling data are not different therebetween. This is applicable to the names of LLS or SLS. For example, service layer signaling (SLS) may be described as service channel signaling (SCS).

Further, in the above description, the elements or attributes have been described when signaling data is described in the binary form or text form, but the names of the elements or attributes are merely exemplary, and other names may be employed. For example, broadcast stream ID defined for FIC or the like may be referred to as network ID, RF allocation ID (RF Alloc ID), RF channel ID, or the like. Incidentally, the difference between the names is formal, and the substantial contents of the elements or attributes are not different.

8. Configuration of Computer

The processing described above can be performed in hardware or in software. When the processing are performed in software, the programs configuring the software are installed in a computer. FIG. 25 is a diagram illustrating an exemplary configuration of hardware of a computer for performing the processing described above by the programs.

A central processing unit (CPU) 901, read only memory (ROM) 902, and random access memory (RAM) 903 are mutually connected via a bus 904 in a computer 900. An I/O interface 905 is further connected to the bus 904. The I/O interface 905 is connected with an input unit 906, an output unit 907, a recording unit 908, a communication unit 909, and a drive 910.

The input unit 906 is configured of a keyboard, mouse, microphone, or the like. The output unit 907 is configured of a display, speaker, or the like. The recording unit 908 is configured of a hard disc, nonvolatile memory, or the like. The communication unit 909 is configured of a network interface or the like. The drive 910 drives a removable medium 911 such as magnetic disc, optical disc, magnetooptical disc, or semiconductor memory.

In the thus-configured computer 900, the CPU 901 loads and executes the programs stored in the ROM 902 or the recording unit 908 into the RAM 903 via the I/O interface 905 and the bus 904 thereby to perform the processing.

The programs executed by the computer 900 (the CPU 901) can be recorded and provided in the removable medium 911 as package medium or the like, for example. Further, the programs can be provided via a wired or wireless transmission medium such as local area network, Internet, digital satellite broadcasting.

In the computer 900, the removable medium 911 is mounted on the drive 910 so that the programs can be installed in the recording unit 908 via the I/O interface 905. Further, the programs can be received by the communication unit 909 and installed in the recording unit 908 via a wired or wireless transmission medium. Additionally, the programs can be previously installed in the ROM 902 or the recording unit 908.

Herein, the processing performed by the computer according to the programs do not necessarily need to be performed in time series in the order described in the flowcharts in the specification. That is, the processing performed by the computer according to the programs include processing performed in parallel or individually (such as parallel processing or object-based processing). Further, the programs may be processed by one computer (processor) or may be distributed and processed in a plurality of computers.

Note that embodiments of the present technology are not limited to the above embodiments, and may be variously changed without departing from the spirit of the present technology.

Further, the present technology can take the following configurations.

(1)

A receiver including:

a first acquisition unit for acquiring first signaling data distributed via broadcast on a broadcast wave of digital broadcasting in an Internet protocol (IP) transmission system;

a second acquisition unit for acquiring broadcast signaling data distributed via broadcast as second signaling data including information on a stream of a component configuring a service on the basis of the first signaling data;

a third acquisition unit for, when flag information included in the broadcast signaling data indicates that communication signaling data distributed via communication is provided from a server over the Internet together with the broadcast signaling data, acquiring the communication signaling data as the second signaling data on the basis of the first signaling data; and a control unit for connecting to a stream of a broadcast component distributed via broadcast or a stream of a communication component distributed via communication thereby to control reproduction of the component on the basis of at least one of the broadcast signaling data and the communication signaling data.

(2)
The receiver according to (1),
wherein the first signaling data includes location information on a destination of the communication signaling data, and
the third acquisition unit acquires the communication signaling data received by accessing the server via the Internet according to the location information included in the first signaling data associated with the broadcast signaling data.

(3)
The receiver according to (1) or (2),
wherein the first signaling data includes bootstrap information for connecting to a stream of the broadcast signaling data, and
the second acquisition unit acquires the broadcast signaling data received according to the bootstrap information included in the first signaling data.

(4)
The receiver according to any of (1) to (3),
wherein the first signaling data includes class information for providing the service in a plurality of forms, and
the control unit connects to a stream of the broadcast component or the communication component configuring the service per form and controls reproduction of the component on the basis of the class information included in the first signaling data.

(5)
The receiver according to any of (1) to (4),
wherein the first signaling data is low layer signaling (LLS) signaling data transmitted in a lower hierarchy than an IP layer in a protocol stack in the IP transmission system, and
the second signaling data is service layer signaling (SLS) signaling data transmitted in a higher hierarchy than the IP layer in the protocol stack in the IP transmission system.

(6)
The receiver according to any of (1) to (5),
wherein the streams of the broadcast component and the broadcast signaling data are transmitted in the real-time object delivery over unidirectional transport (ROUTE) session as extended file delivery over unidirectional transport (FLUTE).

(7)
The receiver according to any of (1) to (6),
wherein the service is an edited program produced by a broadcaster, and can be identified by identification information for uniquely specifying the service.

(8)
A reception method in a receiver, the method including the steps of:
acquiring first signaling data distributed via broadcast on a broadcast wave of digital broadcasting in an IP transmission system;
acquiring broadcast signaling data distributed via broadcast as second signaling data including information on a stream of a component configuring a service on the basis of the first signaling data;
when flag information included in the broadcast signaling data indicates that communication signaling data distributed via communication is provided from a server over the Internet together with the broadcast signaling data, acquiring the communication signaling data as the second signaling data on the basis of the first signaling data; and
connecting to a stream of a broadcast component distributed via broadcast or a stream of a communication component distributed via communication thereby to control reproduction of the component on the basis of at least one of the broadcast signaling data and the communication signaling data,
the steps being performed by the receiver.

(9)
A transmitter including:
a first generation unit for generating first signaling data distributed via broadcast on a broadcast wave of digital broadcasting in an IP transmission system;
a second generation unit for generating broadcast signaling data including flag information indicating whether communication signaling data distributed via communication is provided from a server over the Internet together with the broadcast signaling data distributed via broadcast as second signaling data including information on a stream of a component configuring a service; and
a transmission unit for transmitting the first signaling data and the broadcast signaling data as the second signaling data on a broadcast wave of digital broadcasting in the IP transmission system.

(10)
The transmitter according to (9),
wherein the first signaling data includes location information on a destination of the communication signaling data.

(11)
The transmitter according to (9) or (10),
wherein the first signaling data includes bootstrap information for connecting to a stream of the broadcast signaling data.

(12)
The transmitter according to any of (9) to (11),
wherein the first signaling data includes class information for providing the service in a plurality of forms.

(13)
The transmitter according to any of (9) to (12),
wherein the first signaling data is LLS signaling data transmitted in a lower hierarchy than an IP layer in a protocol stack in the IP transmission system, and
the second signaling data is SLS signaling data transmitted in a higher hierarchy than the IP layer in the protocol stack in the IP transmission system.

(14)
The transmitter according to any of (9) to (13),
wherein the streams of the broadcast component and the broadcast signaling data are transmitted in the ROUTE session as extended FLUTE.

(15)
The transmitter according to any of (9) to (14),
wherein the service is an edited program produced by a broadcaster, and can be identified by identification information for uniquely specifying the service.

(16)
A transmission method in a transmitter, including the steps of:
generating first signaling data distributed via broadcast on a broadcast wave of digital broadcasting in an IP transmission system;
generating broadcast signaling data including flag information indicating whether communication signaling data distributed via communication is provided from a server over the Internet together with the broadcast signaling data distributed via broadcast as second signaling data including information on a stream of a component configuring a service; and transmitting the first signaling data and the broadcast signaling data as the second signaling data on a broadcast wave of digital broadcasting in the IP transmission system, the steps being performed by the transmitter.

REFERENCE SIGNS LIST

1: Service providing system
10: Transmitter
20: Receiver
30: Broadband server
90: Internet
111: Signaling generation unit
113: Video data acquisition unit
115: Audio data acquisition unit
118: Transmission unit
131: LLS generation unit
132: SLS generation unit
212: Tuner
214: Control unit
217: Communication unit
251: Tuning control unit
252: Filtering control unit
253: Signaling acquisition unit
254: Signaling analysis unit
255: Communication control unit
256: Packet header monitoring unit
271: LLS acquisition unit
272: Broadcast SLS acquisition unit
273: Communication SLS acquisition unit
311: Signaling generation unit
313: Video data acquisition unit
315: Audio data acquisition unit
318: Communication unit
900: Computer
901: CPU

The invention claimed is:

1. A receiver, comprising:
tuner circuitry configured to receive a digital broadcast signal; and
processing circuitry configured to
acquire low layer signaling (LLS) data from the digital broadcast signal, the LLS data includes location information of communication signaling data,
acquire signaling data of a selected service distributed via broadcast in response to selecting the service for display,
acquire the communication signaling data, based on the location information indicated in the LLS data when information included in the signaling data indicates that the communication signaling data of the selected service is available via broadband, wherein the communication signaling data includes service layer signaling (SLS) data for the selected service,
receive a video stream and a first audio stream as broadcast components and a second audio stream as a communication component of the selected service, and
control reproduction of the broadcast components and the communication component of the selected service.

2. The receiver of claim 1, wherein the reproduction of the broadcast components is based on the signaling data.

3. The receiver of claim 1, wherein the reproduction of the broadcast components is based on the communication signaling data.

4. The receiver according to claim 1, wherein the processing circuitry is further configured to acquire the communication signaling data from a server according to the location information included in the LLS data.

5. The receiver according to claim 4, wherein
the LLS data includes bootstrap information for connecting to a stream of the signaling data, and
the processing circuitry is further configured to acquire the signaling data of the selected service according to the bootstrap information included in the LLS data.

6. The receiver according to claim 1, wherein the processing circuitry is further configured to store tuning information acquired from the LLS data into a memory during an initial scan processing.

7. The receiver according to claim 6, wherein the processing circuitry is further configured to update the tuning information stored in the memory during a tuning processing.

8. The receiver according to claim 1, wherein the LLS data includes rating information.

9. The receiver according to claim 1, wherein the SLS data includes media presentation description (MPD) or electronic service guide (ESG).

10. The receiver according to claim 1, wherein the circuitry configured to receive the video stream and the first audio stream from a real-time object delivery over unidirectional transport (ROUTE) session in the digital broadcast signal.

11. The receiver according to claim 1, wherein the SLS data includes user service bundle description (USBD).

12. The receiver according to claim 1, wherein the SLS data includes user service description (USD).

13. The receiver according to claim 1, wherein the LLS data includes emergency alert information.

14. The receiver according to claim 1, wherein
the LLS data is in a lower hierarchy than an IP layer in a protocol stack in an IP transmission system,
the signaling data is service level signaling data in a higher hierarchy than the IP layer in the protocol stack in the IP transmission system, and
the communication signaling data is service level signaling data in a higher hierarchy than the IP layer in the protocol stack in the IP transmission system.

15. A method for receiving a digital broadcast signal, comprising:
acquiring low layer signaling (LLS) data from the digital broadcast signal, the LLS data includes location information of communication signaling data;
acquiring signaling data of a selected service distributed via broadcast in response to the service being selected for display;
acquiring the communication signaling data, based on the location information indicated in the LLS data when information included in the signaling data indicates that the communication signaling data of the selected service is available via broadband, wherein the communication signaling data includes service layer signaling (SLS) data for the selected service;
receiving a video stream and a first audio stream as broadcast components and a second audio stream as a communication component of the selected service; and controlling reproduction of the broadcast components and the communication component of the selected service on the basis of the signaling data or the communication signaling data.

16. The method according to claim 15, further comprising acquiring the communication signaling data from a server according to the location information included in the LLS data.

17. The method according to claim 15, further comprising acquiring the signaling data of the selected service according to bootstrap information included in the LLS data, wherein the LLS data includes the bootstrap information for connecting to a stream of the signaling data.

18. The method according to claim 15, further comprising storing tuning information acquired from the LLS data into a memory during an initial scan process.

19. The method according to claim 18, further comprising updating the tuning information stored in the memory during a tuning process.

20. The method according to claim 15, further comprising receiving the video stream and the first audio stream from a real-time object delivery over unidirectional transport (ROUTE) session in the digital broadcast signal.

\* \* \* \* \*